(12) United States Patent
Tsukamoto

(10) Patent No.: US 6,231,133 B1
(45) Date of Patent: May 15, 2001

(54) VEHICLE BRAKE CONTROLLER

(75) Inventor: Masahiro Tsukamoto, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/130,484

(22) Filed: Aug. 7, 1998

(30) Foreign Application Priority Data

Aug. 7, 1997 (JP) .................................................. 9-213661

(51) Int. Cl.[7] .................................................. B60T 8/88
(52) U.S. Cl. .................................. 303/122.04; 303/115.2
(58) Field of Search ........................ 303/115.1, 115.2, 303/122, 122.02, 122.04, 122.05, 122.09, 186, 189, 9.63, 113.5, 113.2

(56) References Cited

U.S. PATENT DOCUMENTS

| 3,737,603 | * | 6/1973 | Kish et al. ............................. 303/9.63 |
| 4,653,815 | | 3/1987 | Agarwal et al. .................... 303/115.2 |
| 5,246,283 | * | 9/1993 | Shaw et al. .......................... 303/115.2 |
| 5,302,008 | * | 4/1994 | Miyake et al. ....................... 303/115.2 |
| 5,312,172 | * | 5/1994 | Takeuchi ............................... 303/115.2 |
| 5,501,511 | * | 3/1996 | Wagner ................................... 303/113.5 |
| 5,558,415 | * | 9/1996 | Buschmann et al. ................ 303/122 |
| 5,887,954 | * | 3/1999 | Steiner et al. ....................... 303/115.2 |

FOREIGN PATENT DOCUMENTS 6-327190  11/1994 (JP) .

* cited by examiner

Primary Examiner—Christopher P. Schwartz
Assistant Examiner—Thomas J. Williams
(74) Attorney, Agent, or Firm—Foley & Lardner

(57) ABSTRACT

A brake pressure is controlled with the left and right front wheels of a vehicle as one group, and the left and right rear wheels as another group. Alternatively, the right front wheel and left rear wheel form one group, and the left front wheel and right rear wheel form another group. Brake pressure is supplied individually to these groups by a first actuator group comprising one or more actuators and a second actuator group comprising one or more actuators. When a fault occurs in an actuator in the first actuator group, the first actuator group is controlled so as not to generate brake pressure, and when a fault occurs in an actuator in the second actuator group, the second actuator group is controlled so as not to generate brake pressure. In this way, unbalance of braking force on the left and right wheels due to a fault in an actuator is prevented, and turning of the vehicle due to this unbalance is suppressed.

14 Claims, 23 Drawing Sheets

VEHICLE BRAKE CONTROLLER

The contents of Tokugan Hei 9-213661, with a filing date of Aug. 7, 1997 in Japan, are hereby incorporated by reference.

FIELD OF THE INVENTION

This invention relates to brake control in a vehicle, and in particular, brake control when a brake actuator becomes defective.

BACKGROUND OF THE INVENTION

In a vehicle brake system, a master cylinder generates oil pressure according to a brake pedal operation of a driver, and this oil pressure is distributed between wheel cylinders. U.S. Pat. No. 4,653,815 further provides a motor drive type actuator for every wheel cylinder to control a brake pressure supply to the respective wheel cylinders. The actuator is provided with a shutoff valve which cuts off the master cylinder and wheel cylinder, and a piston which increases the pressure of the wheel cylinder in response to an electric motor.

The actuator operates according to a signal from a control unit. The pressure of the master cylinder is detected by a pressure sensor. The control unit multiplies this pressure by a coefficient of one or more, so as to compute a target pressure, close the shutoff valve and drive the piston so that the wheel cylinders reach the target pressure.

This device can adapt to normal brake operation or to an antiskid brake function which prevents wheel spin merely by changing over the target value. When one of the actuators is found to be defective, braking is performed by opening all shutoff valves and supplying the pressure of the master cylinder directly to the wheel cylinders.

However, when a specific actuator is occurs. For example, if braking is performed while the left front wheel actuator is defective, brake Pressure is first supplied to the other three wheels by the corresponding pistons. As a result, due to difference force between the left and right front wheels, the vehicle starts to turn right. In particular, on the road surface with a low frictional coefficient, three of the wheels lock due to braking and only the left front wheel rotates.

When the shutoff valve is opened in this state, and the pressure of the master cylinder is supplied directly to all four wheels, the left wheel which was rotating also locks, and it may occur at all four wheels lose their grip in the horizontal direction.

In this case, the vehicle may behave differently from what the driver intends.

SUMMARY OF THE INVENTION

It is therefore an object of this invention to increase the directional stability of a vehicle in braking when an actuator becomes defective.

In order to achieve the above object, this invention provides a brake pressure controller for use with a vehicle brake device. The device comprises a first actuator group comprising one or more actuators for generating a brake pressure for a predetermined combination of a left wheel and a right wheel corresponding to a depression degree of a brake pedal, and a second actuator group comprising one or more actuators for generating a brake pressure for another predetermined combination of a left wheel and a right wheel corresponding to a depression degree of the brake pedal.

The controller comprises a sensor for detecting a faulty actuator and a microprocessor programmed to prevent, when a faulty actuator is found, a faulty actuator group to which the faulty actuator belongs from generating a brake pressure, while controlling the other actuator group to continue generating a brake pressure.

It is preferable that the microprocessor is further programmed to control the other actuator group so as to generate a brake pressure greater than the brake pressure corresponding to the depression degree of the brake pedal.

It is also preferable that the microprocessor is further programmed to control the other actuator group to generate a brake pressure which is lower than the brake pressure corresponding to the depression degree of the brake pedal for a predetermined time, and then generate a brake pressure corresponding to the depression degree of the brake pedal.

When the brake device further comprises a master cylinder for generating a master cylinder pressure corresponding to the depression degree of the brake pedal and a valve for supplying the master cylinder pressure respectively to the wheels, it is preferable that the microprocessor is further programmed to control the faulty actuator group and the valve to apply the master cylinder pressure to the wheels corresponding to the faulty actuator group.

It is also preferable that the microprocessor is further programmed to control the faulty actuator group to decrease the brake pressure generated in the faulty actuator group to be equal to zero.

It is also preferable that the predetermined combination of a left wheel and a right wheel is a left front wheel and a right front wheel, the other predetermined combination of a left wheel and a right wheel is a left rear wheel and a right rear wheel, and the microprocessor is further programmed to control the second actuator group when the faulty actuator group is the second actuator group such that the brake pressure generated by the second actuator group is zero, and control the first actuator group to generate a brake pressure greater than the brake pressure corresponding to the depression degree of the brake pedal.

It is also preferable that the predetermined combination of a left wheel and a right wheel is a left front wheel and a right front wheel, the other predetermined combination of a left wheel and a right wheel is a left rear wheel and a right rear wheel, the brake device is provided with a master cylinder for generating a master cylinder pressure according to the depression degree of the brake pedal and a valve for supplying the master cylinder pressure respectively to the wheels, and the microprocessor is further programmed to control the first actuator group and the valve to apply the master cylinder pressure to the left front wheel and right front wheel, when the faulty actuator group is the first actuator group.

In this case, it is further preferable that the microprocessor is further programmed to control the second actuator group to generate a brake pressure which is lower than the brake pressure corresponding to the depression degree of the brake pedal for a predetermined time, and then generate the brake pressure corresponding to the depression degree of the brake pedal.

It is also preferable that the predetermined combination of a left wheel and a right wheel is a left front wheel and a right front wheel, the other predetermined combination of a left wheel and a right wheel is a left rear wheel and a right rear wheel, the brake device is provided with a master cylinder for generating a master cylinder pressure according to the depression degree of the brake pedal and a valve for supplying the master cylinder pressure respectively to the wheels, and the microprocessor is further programmed to control the second actuator group and the valve to apply the master cylinder pressure to the left rear wheel and right rear wheel, when the faulty actuator group is the second actuator group.

It is also preferable that the predetermined combination of a left wheel and a right wheel is a left front wheel and a right front wheel, the other predetermined combination of a left wheel and a right wheel is a left rear wheel and a right rear wheel, the brake device is provided with a master cylinder for generating a master cylinder pressure according to the depression degree of the brake pedal and a valve for supplying the master cylinder pressure respectively to the wheels, and the microprocessor is further programmed to control the first actuator group and the valve to apply the master cylinder pressure to the left front wheel and right front wheel when the faulty actuator group is the first actuator group, and control the second actuator group to generate a brake pressure greater than the brake pressure corresponding to the depression degree of the brake pedal.

It is also preferable that the predetermined combination of a left wheel and a right wheel is a right front wheel and a left rear wheel, the other predetermined combination of a left wheel and a right wheel is a left front wheel and a right rear wheel, the brake device is provided with a master cylinder for generating a master cylinder pressure according to the depression degree of the brake pedal and a valve for supplying the master cylinder pressure respectively to the wheels, and the microprocessor is further programmed to control the first actuator group and the valve to apply the master cylinder pressure to the right front wheel and left rear wheel when the faulty actuator group is the first actuator group, and control the second actuator group and the valve to apply the master cylinder pressure to the left front wheel and right rear wheel when the faulty actuator group is the second actuator group.

In this case, it is further preferable that the microprocessor is further programmed to control the second actuator group to generate a brake pressure greater than the brake pressure corresponding to the depression degree of the brake pedal, when the faulty actuator group is the first actuator group, and control the first actuator group to generate a brake pressure greater than the brake pressure corresponding to the depression degree of the brake pedal, when the faulty actuator group is the second actuator group.

This invention also provides a brake pressure controller comprising a sensor for detecting a faulty actuator, a first microprocessor programmed to control a first actuator group to prevent the first actuator group from generating a brake pressure when an actuator in the first actuator group is faulty, and a second microprocessor programmed to control a second actuator group to prevent the second actuator group from generating a brake pressure when an actuator in the second actuator group is faulty.

When the brake device is provided with a master cylinder for generating a master cylinder pressure according to the depression degree of the brake pedal and a valve which is permanently open for supplying the master cylinder pressure respectively to the wheels, it is preferable that the controller further comprises a sensor for detecting a fault in the first microprocessor and a sensor for detecting a fault in the second microprocessor, the second microprocessor is further programmed to shut off power to the first microprocessor when a fault is detected in the first microprocessor, and the first microprocessor is further programmed to shut off power to the second microprocessor when a fault is detected in the second microprocessor.

When the brake device further comprises a master cylinder for generating a master cylinder pressure according to the depression degree of the brake pedal and a valve for supplying the master cylinder pressure respectively to the wheels, it is also preferable that the second microprocessor is further programmed to control the valve to apply the master cylinder pressure to the wheels corresponding to the first actuator group when a fault is detected in the first microprocessor, and the first microprocessor is further programmed to control the valve to apply the master cylinder pressure to the wheels corresponding to the second actuator group when a fault is detected in the second microprocessor.

It is also preferable that the first microprocessor is further programmed to control the first actuator group when a fault is detected in an actuator in the first actuator group to decrease the brake pressure generated in the faulty actuator group to be equal to zero, and the second microprocessor is further programmed to control the second actuator group when a fault is detected in an actuator in the first actuator group to generate a brake pressure greater than the brake pressure corresponding to the depression degree of the pedal.

The details as well as other features and advantages of this invention are set forth in the remainder of the specification and are shown in the accompanying drawings.

DESCRIPTION OF THE PREFERRED EMBODIMENTS

Figure 1:
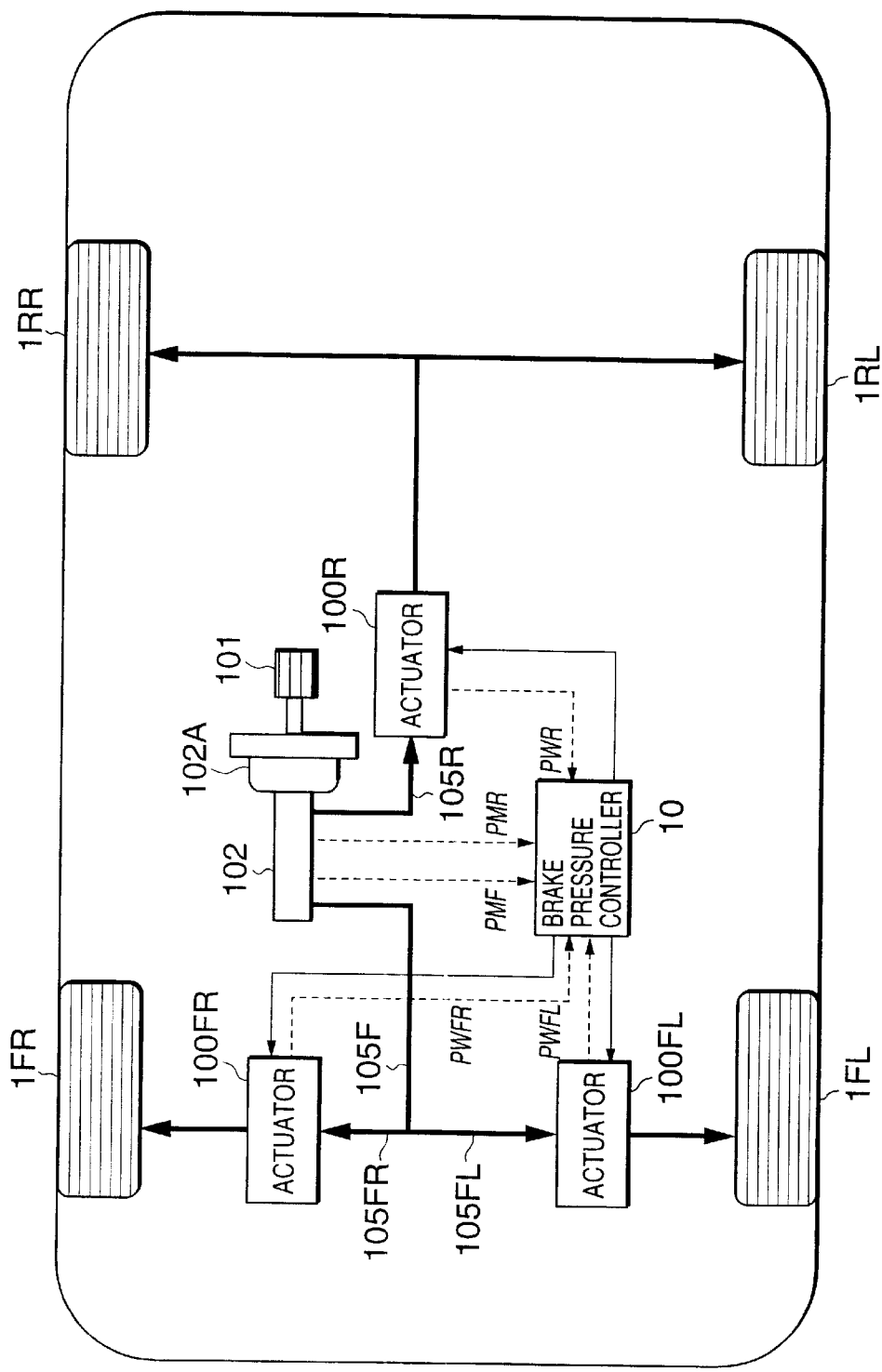
FIG. 1 is a schematic diagram of a brake controller according to this invention.

Referring to FIG. 1 of the drawings, a brake device for braking a left front wheel 1FL, right front wheel 1FR, left rear wheel 1RL and right rear wheel 1RR is provided with a brake pedal 101, negative pressure booster 102A, master cylinder 102, actuators 100FR, 100FL, 100R and brake pressure controller 10.

When the brake pedal 101 is depressed, the depression force is amplified by the negative pressure booster 102A, and is input into the master cylinder 102 as a signal pressure. The master cylinder 102 generates a pressure according to the signal pressure. Devices known in the art may be used for the negative pressure booster 102A and master cylinder 102.

This pressure is supplied to a front wheel brake pipe 105F and a rear wheel brake pipe 105R. The front wheel brake pipe 105F diverges into left and right front wheel pipes 105FL, 105FR. The brake pipe 105FL is connected to a motor drive actuator 100FL and the brake pipe 105FR is connected to a motor drive actuator 100FR.

The brake pipe 105R is connected to the motor drive actuator 100R. The rear wheels 1RR, 1RL are both braked via this motor drive actuator 100R.

This brake device is therefore provided with three actuators.

Figure 2:
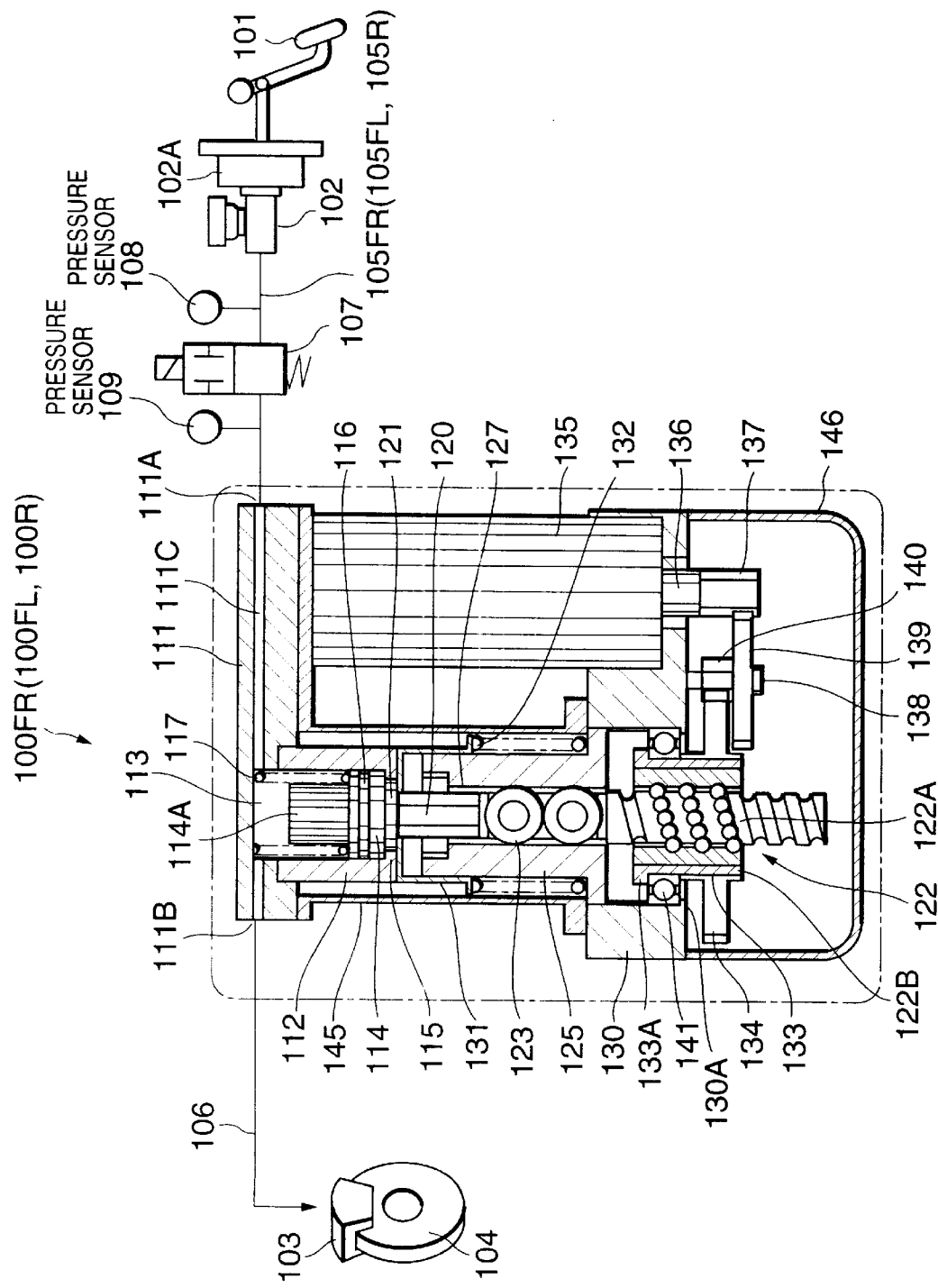
FIG. 2 is an oil pressure circuit diagram of the brake controller containing a longitudinal sectional view of an actuator according to this invention.

Referring next to FIG. 2, each wheel is provided with a disk rotor 104 which rotates together with the wheel, and when a wheel cylinder 103 brakes the disk rotor 104, the wheel is braked. Brake pressure is supplied to the wheel cylinder 103 via the actuator 100FR (100FL, 100R) as described hereabove.

The pressure of the master cylinder 102 is supplied to the actuator 100FR (100FL, 100R) via a brake pipe 105FR (105FL, 105R). An electromagnetic shutoff valve 107 is provided in the brake pipe 105FR (105FL, 105R). A pressure PMF or PMR of the master cylinder 102 is detected by a pressure sensor 108 provided between the shutoff valve 107 and master cylinder 102, and a pressure between the shutoff valve 107 and actuator 100FR (100FL, 100R) is detected by a pressure sensor 109. This detection pressure is used as a wheel cylinder pressure PW (PWFR, PWFL, PWR). The pressures detected by the pressure sensors 108 and 109 are input into a brake pressure controller 10 as signals. A signal from a sensor, not shown, which detects the rotational speed of the wheels 1FR–1RL for anti-skid control of the brake pressure, is also input into the brake pressure controller 10.

The shutoff valve 107 is a spool valve which, when energizing current is not supplied to a solenoid, is maintained in an open state by the pushing force of a spring. On the other hand when the solenoid is energized, the spool is displaced against the force of the spring to a closed position.

Normally, the brake pressure controller 10 detects a depression of the brake pedal 101 according to a variation of the pressure detected by the pressure sensor 108. The brake pressure controller 10 then outputs a close command to the shutoff valve 107, and closes the shutoff valve 107. The brake pressure controller 10, based on the pressure generated by the master cylinder 102, operates the actuator 100FR (100FL, 100R) so as to control the brake pressure of the wheel cylinder 103 via a brake pipe 106.

Next, describing the structure of the actuator 100FR (100FL, 100R), the actuator 100FR (100FL, 100R) is provided with an upper block 111 forming a brake fluid passage 111C.

The brake fluid passage 111C is connected with the brake pipe 105FR (105FL, 105R) via a port 111A, and with the brake pipe 106 via a port 111B.

The brake fluid passage 111C is connected with a cylinder chamber 113 of a cylinder 112 fixed to the upper block 111.

A control piston 114 is housed in the cylinder chamber 113. The capacity of a brake fluid passage from the shutoff valve 107 to the wheel cylinder 103 is increased and decreased by the back-and-forth action of this control piston 114.

The control piston 14 comprises a guide 114A which extends inside the cylinder chamber 113. A return spring 117 is aligned with this guide 114A between the control piston 14 and upper block 111.

The control piston 114 is pushed downwards by the return spring 117 towards a stopper 115 provided at the lower end of the cylinder chamber 113.

A seal member 116 which slides on the wall surface of the cylinder chamber 113 is attached to the outer circumference of the control piston 114. The initial load of the return spring 117 is set slightly larger than the frictional resistance of this sliding part. For example, when the frictional force is 30 Newtons (N), the initial load is set to 50 Newtons (N).

On the other hand, a drive shaft 120 which passes through the stopper 115 comes in contact with the lower end of the control piston 114. A flange 121 is formed at the upper end of the drive shaft 120, and a ball screw 122 is formed at the lower end of the drive shaft 120. The outer diameter of the flange 121 is slightly smaller than the inner diameter of the stopper 115, and is set to be slightly thinner than the stopper 115.

Four bearing rollers 123 are attached to an intermediate part of the drive shaft 120 by a horizontal axis. The drive shaft 120 passes through a guide case 125 arranged underneath the cylinder 112. A rectangular sectional guide groove 127 is formed in an up/down direction in the guide case 125, and each bearing roller 123 is supported free to displace in the up/down direction by rolling along this guide groove 127 while restricting the drive shaft 120 from rotating.

The base end of the guide case 125 is fixed to a platform 130.

A movable spring seat 131 engages free to slide from above on the outer circumference of the guide case 125. The drive shaft 120 passes through this movable spring seat 131 at the upper end of the guide case 125. The movable spring seat 131 is pushed upward by the spring 132, and comes in contact with the flange 121 from below. The piston 114 is pushed upward by the force of the spring 132 against the force of the return spring 117. The spring 132 is set to an initial load so that the movable spring seat 131 comes in contact with the lower end of the control cylinder 112.

The control cylinder 112 and guide case 125, movable spring seat 131 and spring 132 are housed in a cylindrical case 145 that is respectively fixed to the upper block 111 and platform 130 at its upper and lower ends.

A ball screw 122 at the lower end of the drive shaft 120 comprises a male thread part 122A. The male thread part 122A engages with a ball screw nut 122B arranged on its outside. A gear 134 is fixed via a collar 133. The gear 134 and ball screw nut 122 are supported free to rotate relative to the platform 130 by a ball bearing 141 interposed between the collar 122B and platform 130. The upper end and lower end of the ball bearing 141 come in contact with a jaw part 133A of the collar 133 and a jaw part 130A of the platform respectively.

The gear 134 is rotated by an electric motor 135 via a pinion 140 and intermediate gear 139 supported on the platform 130 via a rotation shaft 138.

The pinion 140 and intermediate gear 139 are both fixed to the rotation shaft 138, and rotate together. The pinion 140 engages with the gear 134, and the intermediate gear 139 engages with a pinion 137 attached to an output shaft 136 of the electric motor 135.

These gears and pinions are housed in a case 146 attached to the platform 130.

The spring load of the aforementioned spring 132 is set in relation to the drive force of the electric motor 135 as follows.

An initial load generated in the state where the movable spring seat 131 comes in contact with a lower face of the control cylinder 112 as shown in FIG. 2 is set so as to slightly exceed the maximum drive force in the shaft direction of the electric motor 135. The maximum drive force in the shaft direction of the electric motor 135 is equivalent to a peak value of a cogging torque Tc of the electric motor 135. The cogging torque Tc is a sum total of a torque generated by the attraction of a magnet by the core of the motor and a static friction torque.

For example, assuming the cogging torque Tc=0.05 Newton meter (Nm), the gear ratio Kg=10, and a lead Lb of the ball screw 122=10 mm, the thrust Fc(N) of the driving axle 120 is calculated by the following equation:

$$Fc = \frac{Tc \cdot Kg \cdot 2 \cdot \pi}{\frac{Lb}{1000}} = 314.16 \text{ (N)}$$

From the above calculation, the initial load of the spring 132 is set to approximately 350 (N).

The electric motor 135 is connected to the aforesaid brake pressure controller 10 by wiring, not shown, and is rotated by a control signal from the brake pressure controller 10.

Most of the faults occurring in the actuator 100FR (100FL, 100R) are either breaks in the wiring connecting the electric motor 135 and brake pressure controller 10 or short circuits. Short circuits are due either to electrical contact of the wiring with the vehicle body, or to damage of power elements controlling the electric current.

A relay is interposed between the actuator 100FR (100FL, 100R) and battery of the vehicle in order to block current to the actuator 100FR (100FL, 100FR) in the event of such a shortcut. This relay is controlled by the brake pressure controller 10. A relay is provided for each of the front wheel actuators 100FL, 100FR, and the rear wheel actuator 100R. A similar relay is also provided between the shutoff valves 107 and the battery.

Based on an input signal, the brake pressure controller 10 controls these relays, shutoff valves 107 and electric motors 135 so as to regulate the brake pressures to brake each wheel.

For example, the brake pressure controller 10 compares a wheel cylinder pressure which should occur according to a command signal to the electric motor 135, and a real wheel cylinder pressure detected by the pressure sensor 109. When this pressure differential exceeds a tolerance range, a fault is determined to have occurred in the actuator 100FR (100FL, 100R). When it is determined that there is no fault in any of the actuators 100FR (100FL, 100R), the brake pressure controller 10 makes all relays conducting, and closes all the shutoff valves 107. The brake pressures are then controlled based on the input signals from the wheel speed sensors so that the wheels 1FL–1RL do not lock.

On the other hand, when it is determined that there is a fault in the actuator 100FR (100FL, 100R), the control is different from the control performed during normal operation according to the actuator in which the fault occurred.

For example, when either of the front wheel actuators 100FL, 100FR is found to be defective, control of both of the actuators 100FL, 100FR is stopped, and the control of the rear wheel actuator 100R is performed as during normal operation.

Herein, stopping control of an actuator means that energization of the electric motor 135 and energization of the corresponding shutoff valve 107 is stopped. When energization of the shutoff valve 107 is stopped, the shutoff valve 107 opens, and the pressure of the master cylinder 102 is merely supplied to the wheel cylinder 103 without modification. When control of an actuator is stopped, the corresponding relays are also switched off so as to avoid wasteful power consumption.

When the rear wheel actuator 100R is found to be defective, the corresponding shutoff valve 107 is closed and energization of the electric motor 135 is stopped so that the rear wheel cylinder pressure is effectively 0. Consequently, the piston 114 displaces to its lowermost position in contact with the stopper 115, and the pressure of the wheel cylinder 103 is lowered to the minimum level.

On the other hand, regarding the front wheel actuators 100FL, 100FR, a command value output to the electric motor 135 is increased so that a larger wheel cylinder pressure is generated than during normal operation. This control is performed so as to maintain unchanged the total braking force exerted on the vehicle.

Next, the aforesaid control process performed by the brake pressure controller 10 will be described referring to the flowchart of FIG. 3. This process is executed repeatedly during the period when, for example, the brake pedal is depressed.

First, in a step S201, it is determined by the aforesaid method whether or not a fault has occurred in any of the actuators.

In a step S202, it is determined whether or not the determination result shows no fault, and when there is no fault, the routine proceeds to a step 203.

In the step S203, a master cylinder pressure PMF on the front wheel side, master cylinder pressure PMR on the rear wheel side and wheel speeds are read.

In a step S204, based on these data, the braking force of each wheel is determined. Specifically, during normal operation, the braking force exerted on the wheels, i.e. the wheel cylinder pressure, is determined according to the master cylinder pressure, and during antiskid control, it is determined based on wheel speed and vehicle speed.

In a step S205, a drive signal of the electric motor 135 is calculated so as to obtain the determined wheel cylinder pressure.

The calculation is for example a direct proportion calculation or a directly proportional integration based on a difference between the determined wheel cylinder pressure and a real wheel cylinder pressure detected by the pressure sensor 109.

In a step S206, all relays are switched ON, i.e. made conducting.

In a step S207, all shutoff valves 107 are closed, and a drive signal is output to the electric motors 135 in a step S208. After performing the step S208, the process starting from the step S201 is repeated.

The process of the steps S203–S208 is a braking force control process which is known in the art, and details of this process are therefore omitted.

On the other hand, when it is determined in the step S202 that there is a fault, it is first determined in a step S210 whether or not a fault occurred in the front wheel actuators 100FL or 100FR.

When a fault occurs in a front wheel actuator, the rear wheel speed master cylinder pressure PMR detected by the rear wheel pressure sensor 108 and a rear wheel speed are read in a step S211.

In a step S212, a braking force exerted on the rear wheels 1RL, 1RR is calculated, i.e. a rear wheel cylinder pressure, is calculated based on this data.

This calculation is performed by the same method as that of the step S204.

In a step S213, the drive signal of the rear wheel electric motor 135 is calculated so as to obtain the calculated wheel cylinder pressure. This calculation is performed by the same method as that of the step S205.

Specifically, in the step S202, even when it is determined that there is a fault and the fault is in the front wheels, the same braking force control is performed for the rear wheels 1RL, 1RR as in the normal condition.

In a step S214, all front wheel relays are switched off, i.e. cut off. As a result, the front wheel electric motors 135 of the actuators 100FL, 100FR are not driven, and the pressure of the master cylinder 102 is supplied to the front wheel cylinder 103 via the opened shutoff valve 107.

Therefore in the front wheels, the braking force is equivalent to the pressure of the master cylinder 102.

In a step S215, all the rear wheel relays are switched on, i.e. made conducting, and the rear wheel shutoff valves 107 are closed in a step S216. As a result, the master cylinder pressure MPR is not supplied to the rear wheel cylinder 103, and the rear wheel cylinder pressure is controlled by the actuator 100R in response to the electric motor 135.

In a step S217, a drive signal is output to the electric motor 135 of the rear wheel actuator 100R.

After performing the step S217, the routine returns to the step S211, and the processing of the steps up to the step S217 is repeated.

On the other hand, when it is determined in the step S210 that a fault is located in the rear actuator 100R, the process proceeds to a step S221. In the step S221, the master cylinder pressure PMF of the front wheels detected by the front wheel pressure sensor 108 and the front wheel speeds are read.

In a step S222, the braking force exerted on the front wheels 1FL, 1FR, i.e. the front wheel cylinder pressure, is calculated based on this data. This pressure is determined by increasing the pressure calculated by the same method as that of the step S204, by a predetermined factor. When there is a fault in the rear wheel actuator 100R, the rear wheel braking force is added to the front wheel braking force as described hereabove. Generally, in the normal state, the braking force is divided between the front wheels and rear wheels in a proportion of 7:3.

Therefore, the front wheel cylinder pressure can be calculated by multiplying the result calculated by the same method as that of the step S204, by 10/7.

In a step S223, the drive signal of the front wheel electric motor 135 is calculated so as to obtain the calculated wheel cylinder pressure.

In a step S224, all front wheel relays are switched on, i.e. made conducting, and the front wheel shutoff valve 107 is closed in the step S225. As a result, the master cylinder pressure MPF is not supplied to the front wheel cylinder 103, and the front wheel cylinder pressure is controlled by the actuators 100FL, 100FR in response to the electric motor 135.

In a step S226, the relay of the rear wheel shutoff valve 107 is switched on, i.e. is made conducting. As this makes it possible to close the shutoff valve 107, the shutoff valve 107 is closed in a following step S227, and supply of master cylinder pressure MPR to the rear wheel cylinder 103 is also blocked.

In a step S228, the relay of the rear wheel electric motor 135 is switched off, i.e. cut off. Due to this, the piston 114 of the actuator 100R retreats to its lowermost position in which it comes in contact with the stopper 115 as shown in FIG. 2, and the rear wheel cylinder pressure falls until it effectively becomes 0.

In a step S229, the drive signal calculated in the step S223 is output to the electric motor 135 of the front wheel actuators 100FL, 100FR. After performing the step S229, the routine returns to the step S221, and the processing up to the step S229 is repeated.

Next, the case will be considered where, in the above process, only one of, for example, the front wheel actuators 100FL, 100FR has a fault. In this case, a difference of braking force is produced between the front wheels 1FL, 1FR, a difference of braking force is produced between the front wheels 1FL, 1FR, and the vehicle starts to turn toward the side where the braking force is larger.

In this case, the processing of the above steps S211–S217 is performed. As a result, the master cylinder pressure MRF is supplied to the front wheels 1FL, 1FR, but braking force control is performed for the rear wheels 1RL, 1RR by the actuator 10RR as in the case of normal operation. The imbalance of braking force between the front wheels 1FL, 1FR is therefore canceled.

On a road surface having a low frictional coefficient, antiskid control is applied to the braking force of the rear wheels 1RL, 1RR. A desirable braking force can therefore be obtained on such a road surface.

According to the aforesaid prior art, when one of the actuators is found to be defective, the master cylinder pressure is supplied to the wheel cylinders of all four wheels, so antiskid control is not performed.

When the rear wheel actuator 100R has a fault, the processing of the steps S221–S229 is performed. A larger braking force than during normal operation is therefore supplied to the front wheels, and the braking force of the rear wheels effectively becomes 0.

As the actuator 100R of the rear wheels is common to the left and right rear wheels 1RL, 1RR, an imbalance in the braking force acting on the rear wheels 1RL, 1RR does not occur. Also, as the braking force is essentially 0, the rear wheels do not lock even on a road surface having a low coefficient of friction, and the grip of the rear wheels in the transverse direction can be maintained.

It might be thought that the master cylinder pressure PMR could also be applied to the rear wheel cylinder 103, but in this case the rear wheels may lock and lose their grip in the transverse direction.

Also, as a larger braking force than during normal operation acts on the front wheels 1FL, 1FR, the vehicle as a whole can maintain a sufficient braking force.

Figure 4:
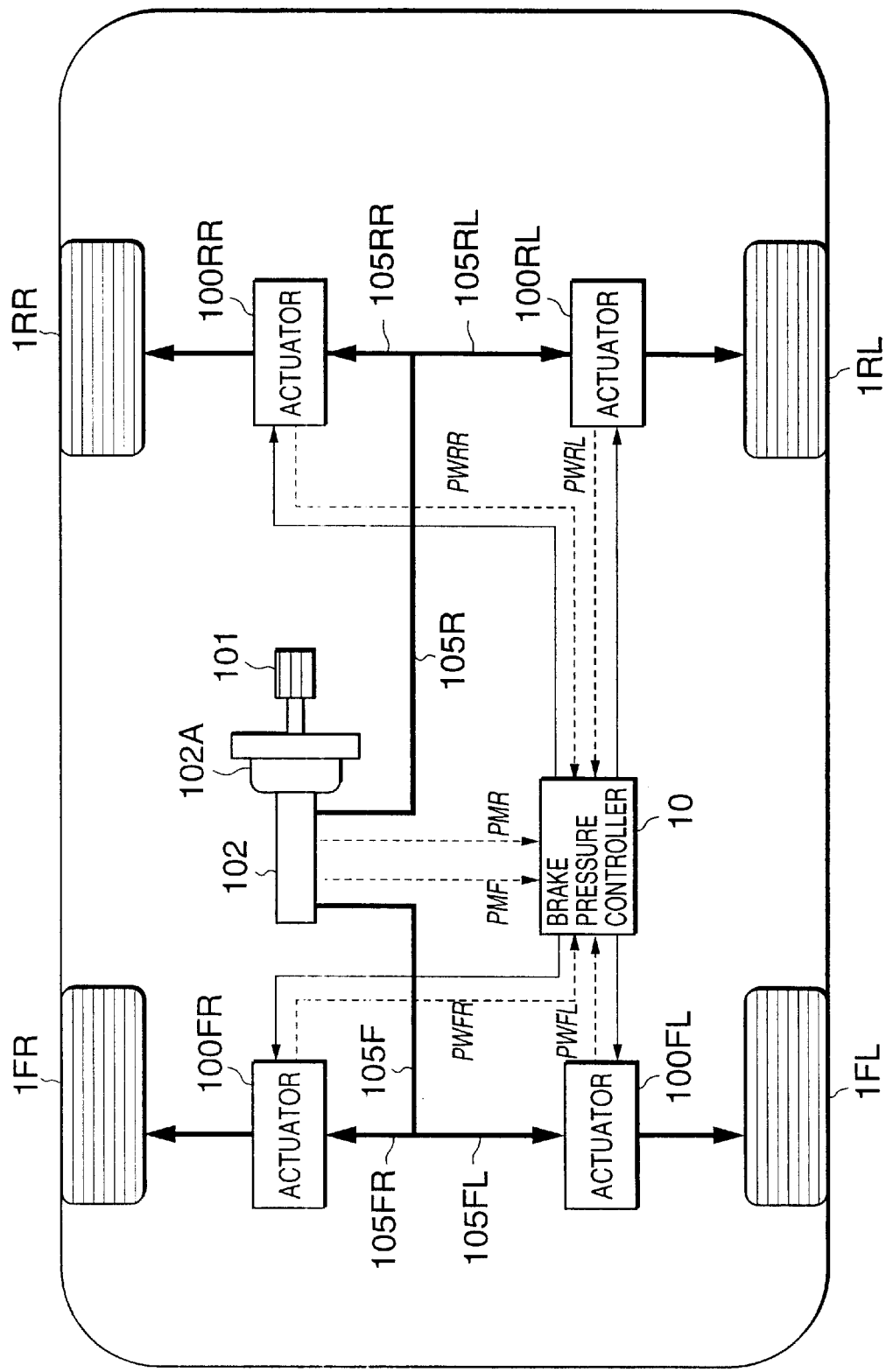
FIG. 4 is a schematic diagram of a brake controller wherein an actuator is provided for each wheel.

According to this embodiment, this invention is applied to a braking device which controls the left and right rear wheels 1RL, 1RR by a single actuator 100R. However, the invention may also be applied to a device using different actuators 100RL, 100RR for the left and right rear wheels 1RL, 1RR, as shown in FIG. 4. In such a device, the control when the front wheel actuator 100FLR or 100FR has a fault is identical to that of the aforesaid embodiment.

A difference does occur when either of the rear wheel actuators 100RL, 100RR has a fault. Specifically, a difference between the left and right rear wheels appears when the wheel cylinder pressure corresponding to the faulty actuator is effectively 0, and the wheel cylinder pressure of the other rear wheel is controlled in the same way as for normal operation via the actuator.

However, as antiskid control is applied in the control of wheel cylinder pressure by the actuator which is operating normally, the force acting on the vehicle in the transverse direction is not so large as when the front wheel actuator has a fault. Therefore, a common guideline can be applied to a fault of a rear wheel actuator, i.e. the wheel cylinder pressure corresponding to the faulty actuator may effectively be set to 0, whether there is one or two rear wheel actuators.

Next, a second embodiment of this invention will be described referring to FIG. 5.

This embodiment relates to an application of this invention to a braking device which does not have an antiskid function, or to the case where antiskid control is impossible due, for example, to a fault in a wheel speed sensor.

The construction of the vehicle and construction of the actuator are the same as those of the aforesaid first embodiment.

Figure 3:
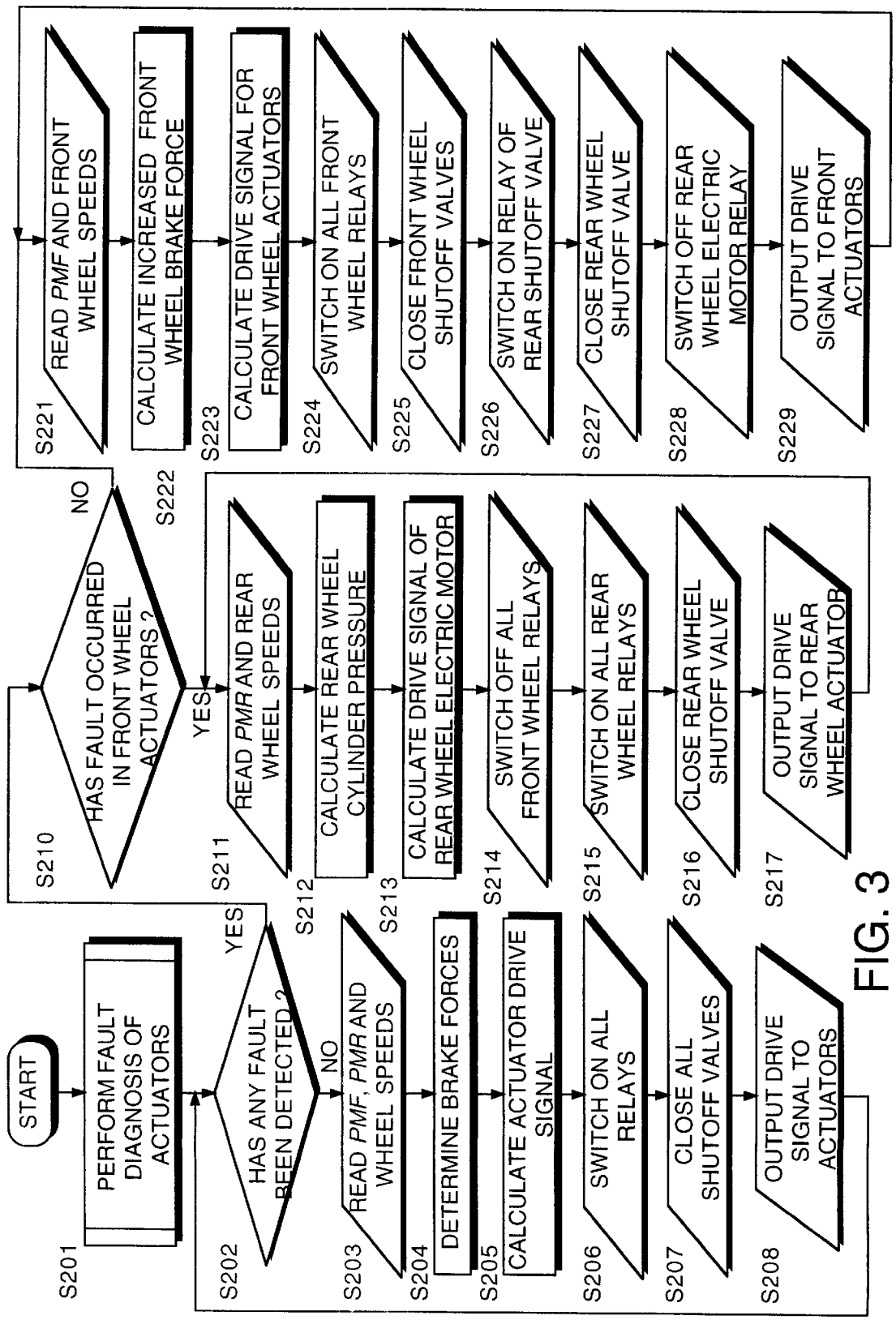
FIG. 3 is a flowchart describing a brake pressure control process performed by the brake controller.

According to this embodiment, steps S250–S256 are added to the process of FIG. 3, and steps S260–S266 are provided instead of the steps S221–S229. According to this embodiment, when a fault appears in the front wheel actuators 100FL or 100FR, a different solution is adopted according to the type of fault.

Specifically, when pressure increase of the wheel cylinder 103 by the actuator 100FR or 100FL is impossible, control of the actuator 110 of the front wheel actuators 100FL, 100FR is stopped, the shutoff valve 107 is opened, and braking is performed by the pressure of the master cylinder 102. Regarding control of the rear wheel actuator 100R, the braking pressure is first reduced to the extent that grip can be recovered, and then ordinary braking force control is performed.

This is the same for a road surface with a small coefficient of friction, and in this case, the braking force is reduced to 0.5 MPa (megapascal) or less by a conversion value to the wheel cylinder pressure. Subsequently, after a predetermined time, a return is made to normal braking pressure control.

This predetermined time is equivalent to the time required for the vehicle to recover its grip and to stop the vehicle from turning, and may be set to for example to 1 second.

When a fault which would cause the braking pressure of the wheel cylinder 103 to increase, occurs in the actuator 100FL or 100FR, control of the actuators 100FL, 100FR is stopped and the shutoff valve 107 opens.

Regarding the rear wheel actuator 100R, the same control is performed as during normal operation.

When a fault occurs in the rear wheel actuator 100R, the front wheel actuators 100FL, 100FR are controlled as during normal operation, control of the rear wheel actuator 100R is stopped, and the shutoff valve 107 is opened.

Describing the above control referring to the flowcharts, when it is determined in the step S210 that a fault has occurred in the front wheel actuator 100FL or 100FR, it is determined in the step S250 whether or not the fault is such that it increases the pressure in the front wheel cylinder.

For example, when the wheel cylinder pressure PW rises although a pressure increase signal is not output to the electric motor 135 of the faulty actuator 100FL or 100FR, it is determined that the fault is causing pressure increase in the wheel cylinder. When the wheel cylinder pressure PW detected by the pressure sensor 109 does not rise even If a pressure increase signal is output to the electric motor 135, it is determined that the fault is not of such a type to increase the wheel cylinder pressure.

If the pressure sensor 109 is faulty even if the actuator is operating normally, the controller 10 attempts to increase the detection pressure of the pressure sensor 109. As a result, the real pressure of the wheel cylinder 103 increases and the same phenomenon occurs as if the pressure were really increased due to the fault of the actuator.

To prevent this kind of incorrect determination, according to this embodiment, a fault of the actuator and a fault of pressure sensor are distinguished by monitoring the electric current supplied to the electric motor 135.

In the step S250, when it is determined that a fault which does not cause pressure increase has occurred in the front wheel actuator 100FL or 100FR, all front wheel relays are switched off in the step S251 as in the processing of the aforesaid step S214.

Due to this, the pressure of the master cylinder 102 is supplied directly to the wheel cylinder 103, and the front wheels are braked according to the depression of the brake pedal 101.

In the following step S252, the relay of the rear shutoff valve 107 is switched on, i.e. it is made conducting, and in a step S253 the shutoff valve 107 is closed. After this operation, the master cylinder pressure PMR is not supplied to the rear wheel cylinder 103.

In a step S254, the relay of the rear electric motor 135 is switched off. The piston 114 of the actuator 100R therefore withdraws to its lowermost position in which it is in contact with the stopper 115, and the rear wheel cylinder pressure decreases until it is effectively 0.

Therefore, when the step S254 is completed, a brake pressure depending on the depression of the brake pedal 101 is applied to the front wheels 1FL, 1FR, and brake pressure does not act on the rear wheels 1RL, 1RL.

In the following step S255, a timer is started after having been cleared.

In a step S256, it is determined whether or not a predetermined time, e.g. one second, has elapsed.

After waiting until one second has elapsed, the processing of the steps S211–S217 is performed which is identical to that of the aforesaid first embodiment.

As a result, regarding the front wheels 1FL, 1FR, braking according to the depression of the brake pedal 101 is performed, and regarding the rear wheels 1RL, 1RR, the same control is performed as for normal operation without antiskid control.

After performing the step S217, the routine returns to the step S211, and the processing up to the step S217 is repeated.

According to this embodiment, antiskid control is not performed, so the wheel speed is not read in the step S203.

On the other hand, in the step S250, when it is determined that the fault is of such a type that increases the pressure of the front wheel cylinder 103, the processing of the steps S211–S217 is performed. If it is determined that the fault has not occurred in the front wheel actuator 100FL or 100FR, the process is performed according to the steps S260–S266.

In the step S260, the master cylinder pressure PMF detected by the front wheel pressure sensor 108 is read.

In the step S261, a brake pressure distributed between the front wheels 1FL, 1FR is determined based on the master cylinder pressure PMF. This determination is performed by the same method as that of the determination of the step S204.

In the step S262, a drive signal of the electric motor 135 corresponding to the determined brake pressure is calculated.

In the step S263, all front wheel relays are switched on, and the front wheel shutoff valve 107 is closed in the step S264. Due to this, the front wheel brake pressure is controlled by the actuator 100FL and 100FR.

In the step S265, all rear wheel relays are switched off. Due to this, the rear wheel actuator 100R cannot be driven, and the rear wheel shutoff valve 107 is maintained in an opened state.

Therefore, for the rear wheels, the master cylinder pressure MPR is supplied to the wheel cylinder 103, and braking is performed according to the depression of the brake pedal 101.

In the step S266, the drive signal calculated in the step S262 is output to the electric motor 135 of the front wheel actuators 100FL, 100FR.

After having completed the processing of the step S266, the processing of the steps S260–S266 is repeated.

When the front wheel actuator 100FL or 100FR has a fault, a difference is produced between the brake pressure acting on the left and right front wheels, so the vehicle attempts to turn.

In a brake device in which antiskid control of brake pressure is not performed as in this embodiment, the rear wheels 1RL, 1RR may lock.

According to this embodiment, in this case, the front wheels are braked by the master cylinder MPF in the steps S251–S254, and the wheel cylinder pressure of the rear wheels temporarily falls. Therefore, the grip of the rear wheels 1RL, 1RR recovers, and the tendency of the vehicle to turn is suppressed. After grip has been restored, the same control of brake pressure is applied to the rear wheels as for normal operation.

When a fault occurs such as to make the front wheel cylinder pressure increase, the vehicle tends to turn. However in this case, as control of the front wheel actuators 100FL, 100FR is stopped, and the master cylinder pressure MPF is supplied to the front wheel brake cylinder 103, the tendency of the vehicle to turn is suppressed. Further, as the same brake force control is applied to the rear wheels as in the case of normal operation, and the master cylinder pressure MPF is supplied to the front wheel cylinder, the brake pressure is not deficient.

On the other hand, if the rear wheel actuator 100R breaks down, ordinary brake force control is applied to the front wheels, and the master cylinder pressure MPR is supplied to the rear wheel cylinder 103. In this case also, the tendency of the vehicle to turn is suppressed, and sufficient brake power is obtained for the vehicle overall.

This embodiment can also be applied to a fault in the shutoff valve 107, and it may be applied to a brake device in which an actuator is provided for each of the rear wheels as in the case of the aforesaid first embodiment. Further, as in the case of the first embodiment, when a fault occurs in the rear wheel actuator, the rear wheel cylinder pressure may effectively be set to 0, and the brake pressure supplied to the front wheels may be increased accordingly. However, in this case, the maximum braking force drops slightly.

Figure 6:
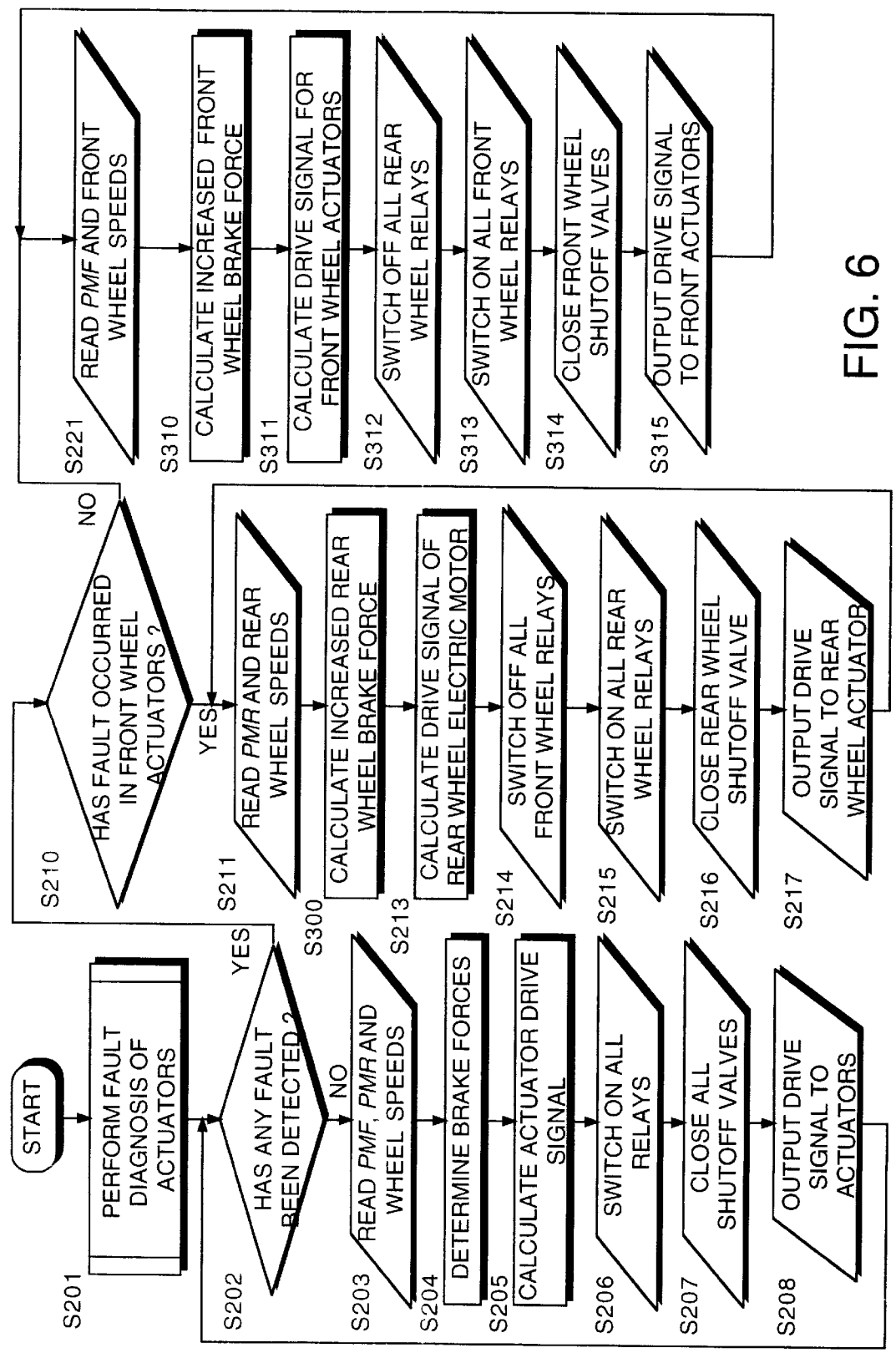
FIG. 6 is similar to FIG. 5, but showing a third embodiment of this invention.

FIG. 6 shows a third embodiment of this invention.

According to this embodiment, the invention is applied to a brake device wherein the negative pressure booster 102A is omitted from the construction of the aforesaid first embodiment. In a brake device wherein the wheel cylinder pressure is increased and decreased by an actuator, master cylinder pressure is not used in normal operation, so the negative pressure booster 102A is also unnecessary. However, as the master cylinder pressure is correspondingly lower, a problem arises when the actuator has a fault.

This embodiment takes account of such a brake device.

When a fault occurs in the front wheel actuator 100FL or 100FR, front wheel braking is performed by the master cylinder pressure MPF. However, as the master cylinder pressure is low, sufficient force to brake the vehicle is obtained by increasing the pressure generated by the rear wheel actuator 100R. If the rear wheel actuator 100R has a fault, the pressure generated by the front rear wheel actuator 100FL, 100FR may be increased in a similar manner.

Therefore according to this embodiment, a step S300 is provided instead of the step S212 of FIG. 3, steps S310–S315 are provided instead of the steps S222–S229.

When a fault occurs in the rear wheel actuator 100R in the step S210, the master cylinder pressure PMR and rear wheel speed are read in the step S211.

In the next step S300, a larger rear wheel braking pressure than in normal operation is determined using these values. For example, in sedans, the ratio of brake pressures applied to the front wheels and rear wheels is usually 7:3. Therefore, the rear wheel cylinder pressure can be determined by multiplying the rear wheel cylinder pressure calculated by the same method as that of the aforesaid step S212, by a gain of 10/3.

The processing of the steps S213–S217 is performed based on the rear wheel cylinder pressure determined in this way. On the other hand, when it is determined in the step S210 that a fault has occurred in the front wheel 100FL or 100FR, the routine proceeds to the step S221. Here, the master cylinder pressure PMF of the front wheels and the front wheel speeds are read.

In the following step S310, a larger front wheel brake pressure than during normal operation is determined using these values. This is determined in the same way as in the step S222 of the first embodiment.

The remaining processing in the steps S311–S315 is similar to that in steps S213–S217. The difference is that the front brakes are handled in S311–S315 while the rear brakes are handled in S213–S217. The processing of the steps S221–S315 is then repeated.

According to this embodiment, when the front wheel actuator 100FL or 100FR has a fault, the vehicle starts to turn due to the imbalance of brake pressure. As antiskid control is performed for the rear wheels as necessary, the rear wheels 1RL, 1RR do not lock. In this case, therefore, what is required is to eliminate the turning force acting on the vehicle. This is achieved by switching off the front wheel relay in the step S214.

At this time, the front wheel master cylinder pressure MPF is low, but as the rear wheel cylinder pressure has been increased in the step S300, sufficient braking force is obtained for the vehicle as a whole.

When the rear wheel actuator 100R has a fault, the master cylinder pressure MPR is supplied to the rear wheel cylinder 103 in the step S312. The lower this pressure, the more the front wheel cylinder pressure is increased in the step S310, so sufficient brake pressure is still obtained for the vehicle as a whole.

This embodiment is particularly well suited to brake devices with a low master cylinder pressure. Therefore, it may be applied to a brake device having a reservoir tank instead of a master cylinder, described hereafter and shown in FIG. 22, or the brake device of the sixth embodiment described hereafter wherein a brake pad is pressed against a disk by a motor instead of using a hydraulic system.

Figure 7:
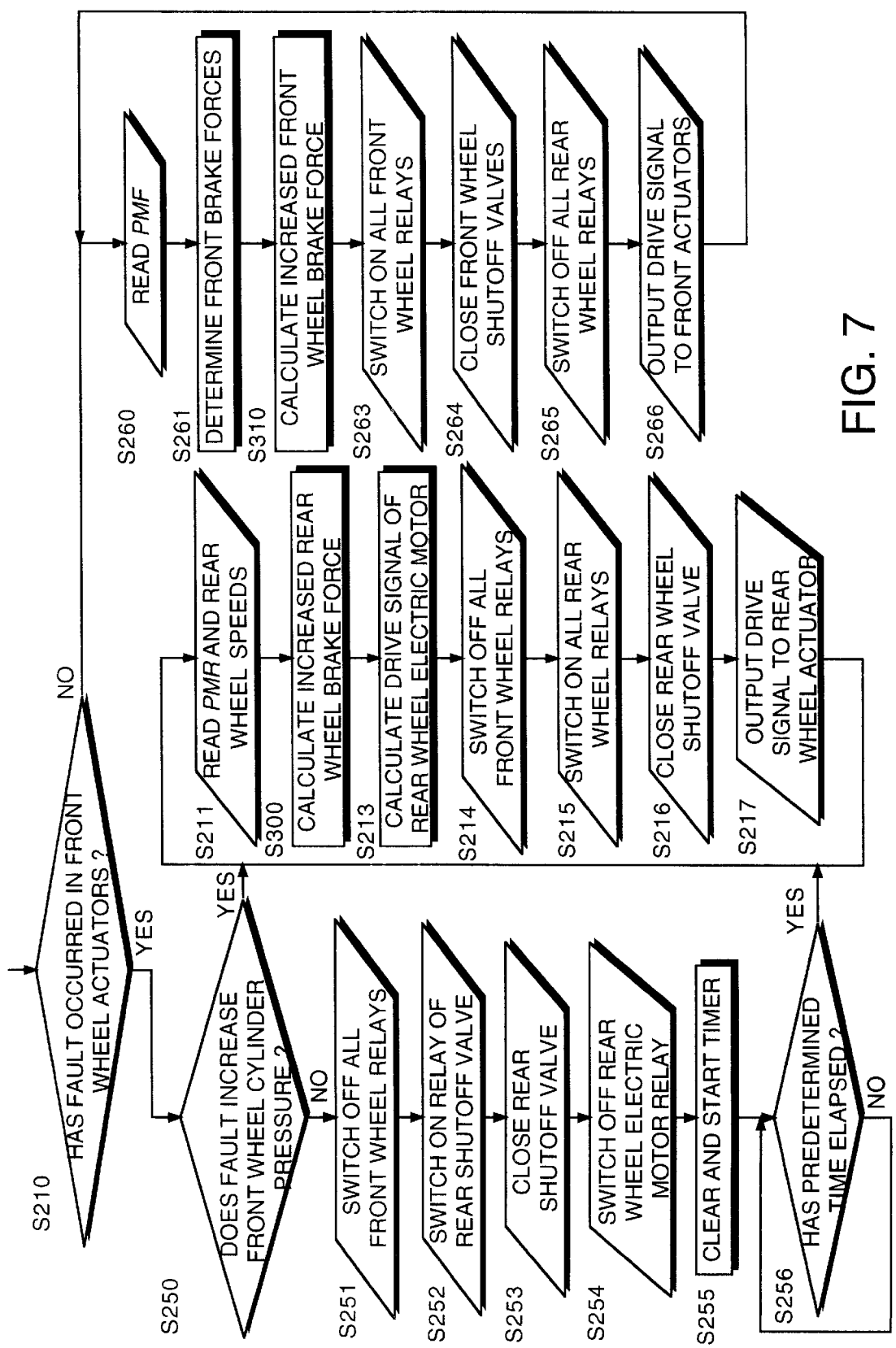
FIG. 7 is similar to FIG. 5, but showing a fourth embodiment of this invention.

FIG. 7 shows a fourth embodiment of this invention.

This embodiment is for a vehicle brake device which has no antiskid function or a vehicle brake device wherein the antiskid function is faulty as in the case of the aforesaid second embodiment. The brake device has no negative pressure booster 102A as in the case of the aforesaid third embodiment.

Figure 5:
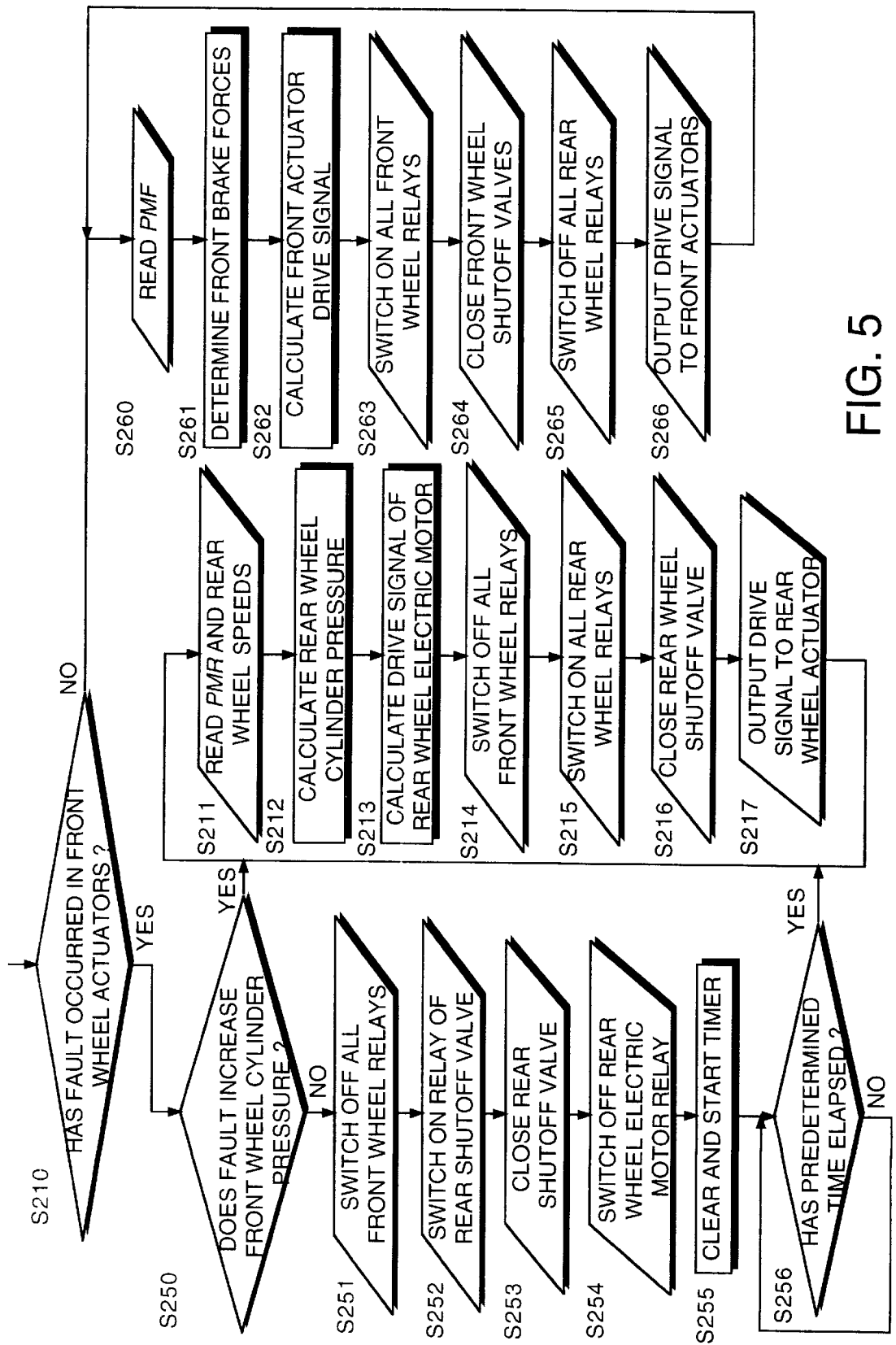
FIG. 5 is a flowchart describing a brake pressure control process using a brake controller according to a second embodiment of this invention.

A difference between this embodiment and the process of FIG. 5 is that the step S300 is provided instead of the step S212, and the step S310 is provided instead of the step S261.

According to this embodiment, in a device which does not have an antiskid function or a negative pressure booster, the tendency of the vehicle to turn is suppressed, and sufficient braking force for the vehicle as a whole is obtained.

Figure 8:
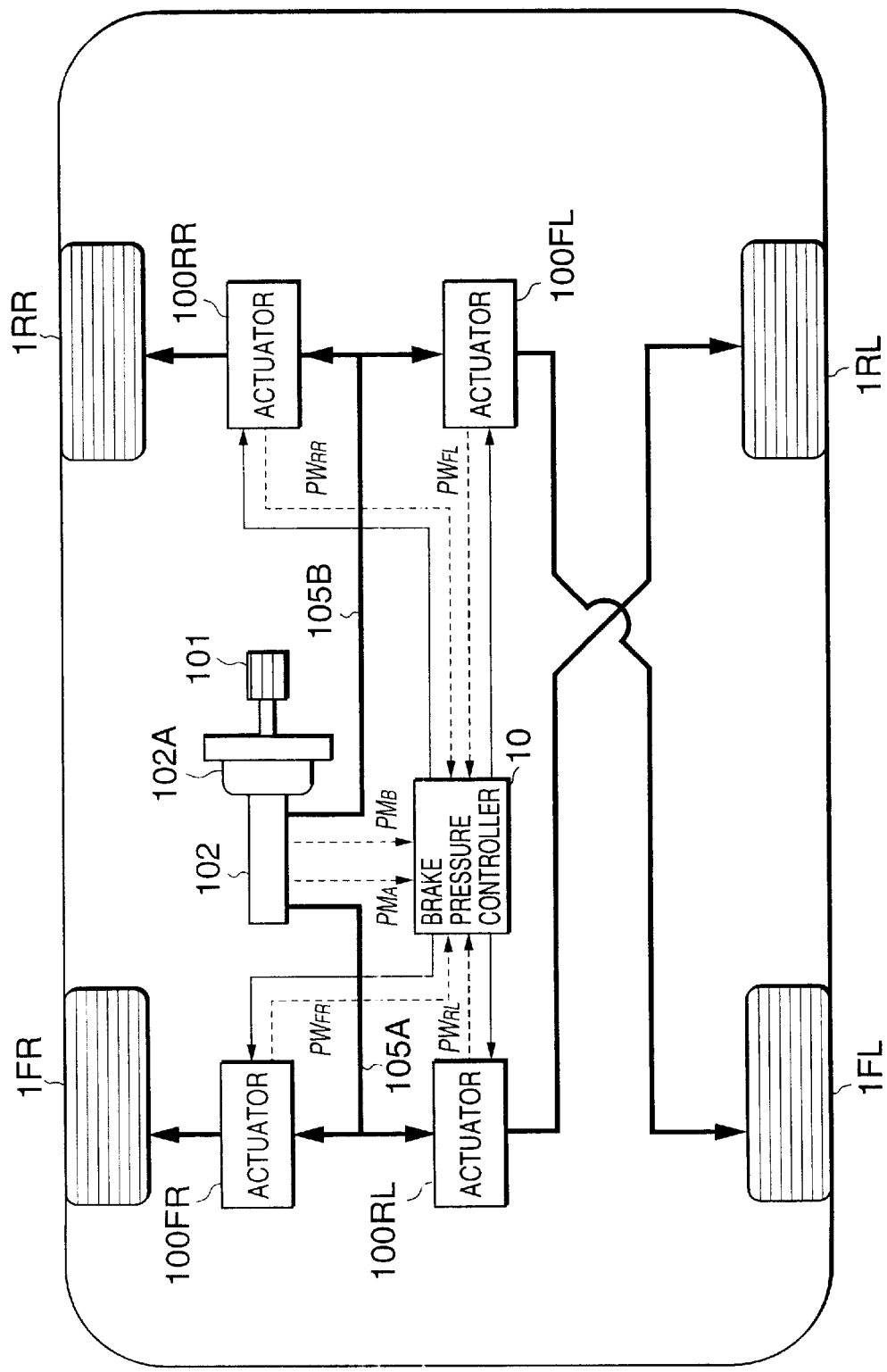
FIG. 8 is a schematic diagram of a brake controller according to a fifth embodiment of this invention.

FIG. 8 shows a fifth embodiment of this invention.

According to this embodiment, the invention is applied to a brake device comprising actuators 100FL–100RR for each of the wheels 1FL–1RR. The brake pressure controller 10 controls the brake pressure for the front wheel actuator 100FL and rear wheel actuator 100RR as one group, and for the front wheel actuator 100FR and rear wheel actuator 100RL as another group.

When a fault occurs in either of these groups, the brake pressure is controlled as follows.

Specifically, when the brake device comprises the negative pressure booster 102A and is provided with an antiskid control function, all relays affecting the group which includes the faulty actuator are switched off, and the master cylinder pressure is supplied to the wheel cylinders in this group.

The brake pressure control for normal operation is applied to the actuators in the other group.

When the brake device comprises the negative pressure booster 102A but an antiskid function is not provided, the wheel cylinder pressure of the group including the faulty actuator is decreased as in the case of the aforesaid second embodiment until the wheel grip recovers. Subsequently, after a predetermined time has elapsed, all relays affecting this group are switched off. The master cylinder pressure is then supplied to the wheel cylinders in the group.

When the brake device does not comprise the negative pressure booster 102A but an antiskid function is provided, all relays affecting the group which comprises the faulty actuator are switched off, and the master cylinder pressure is supplied to the wheel cylinders of this group.

For the actuators in the other groups, the actuators are controlled so that a larger brake pressure is generated than in normal operation as in the case of the aforesaid third embodiment.

When the brake device does not comprise the negative pressure booster 102A and an antiskid function is not provided either, all relays affecting the group which comprises the faulty actuator are switched off, and the master cylinder pressure is supplied to the wheel cylinders of this group.

For the actuators in the other groups, the actuators are controlled so that a larger brake pressure is generated than in normal operation as in the case of the aforesaid third embodiment.

In any of the aforesaid cases, for groups comprising a faulty actuator, the brake pressure used for braking each of the wheels is the same, so the tendency of the vehicle to turn is suppressed.

Moreover, in a brake device having an antiskid function, antiskid control of brake pressure is performed via an actuator in a group where the actuator is not faulty, so the vehicle does not lose its grip and the tendency of the vehicle to turn is further suppressed.

When the brake pressure in the other group is increased more than in the normal case, it is desirable that the same brake pressure is supplied to the front and rear wheels in this group. This is in order to prevent the generation of a moment around the center of gravity of the vehicle which may be considered to be at the center in the lateral direction of the vehicle.

According to this embodiment, control when the booster 102A is not provided is particularly suited to the case when the master cylinder pressure is low. Therefore, it may be applied to a brake device which does not have a master cylinder, described hereafter and shown in FIG. 22, or the brake device of the sixth embodiment described hereafter wherein a brake pad is pressed against a disk by a motor instead of using a hydraulic system.

Figure 9:
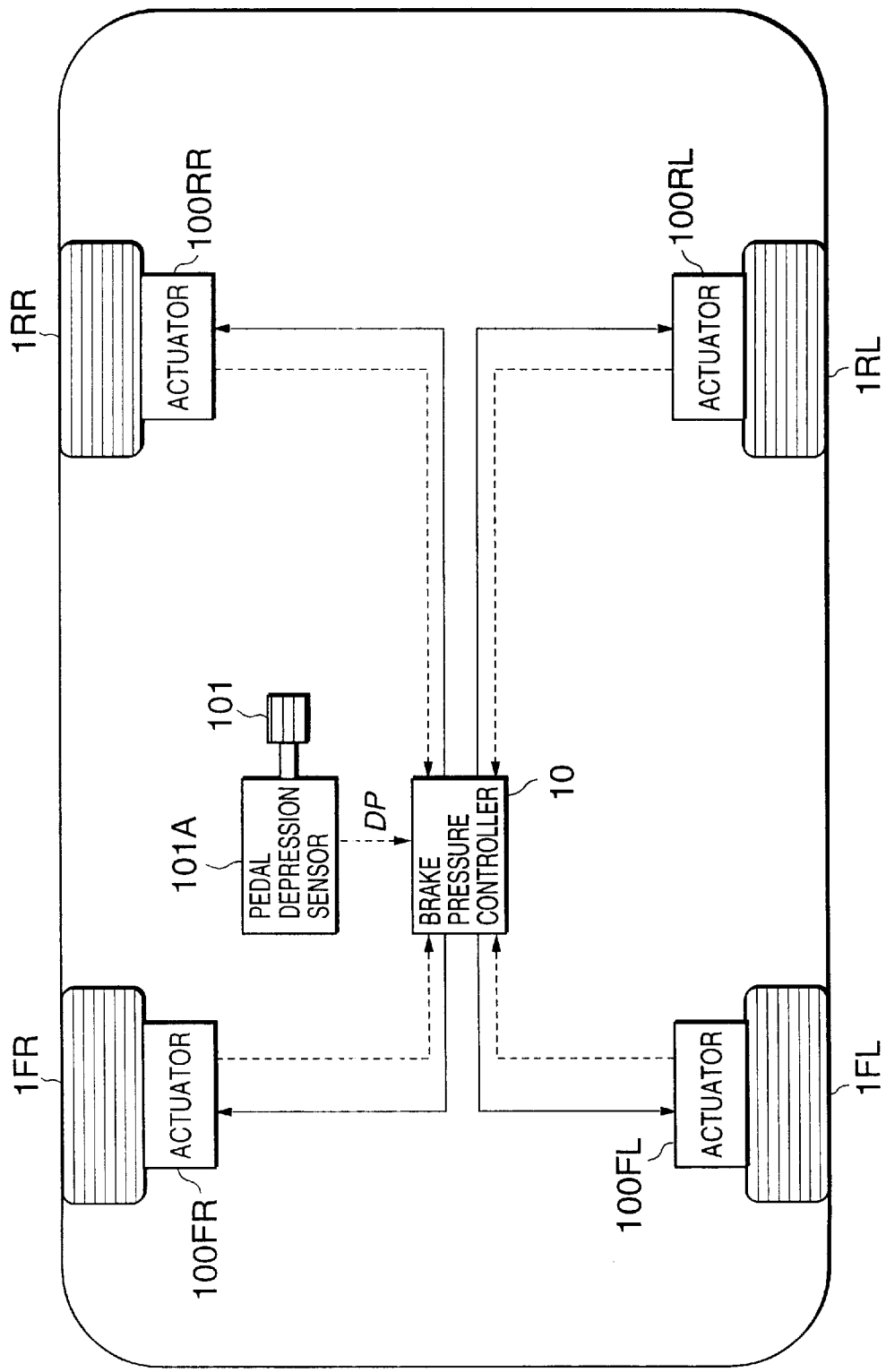
FIG. 9 is a schematic diagram of a brake controller according to a sixth embodiment of this invention.
Figure 10:
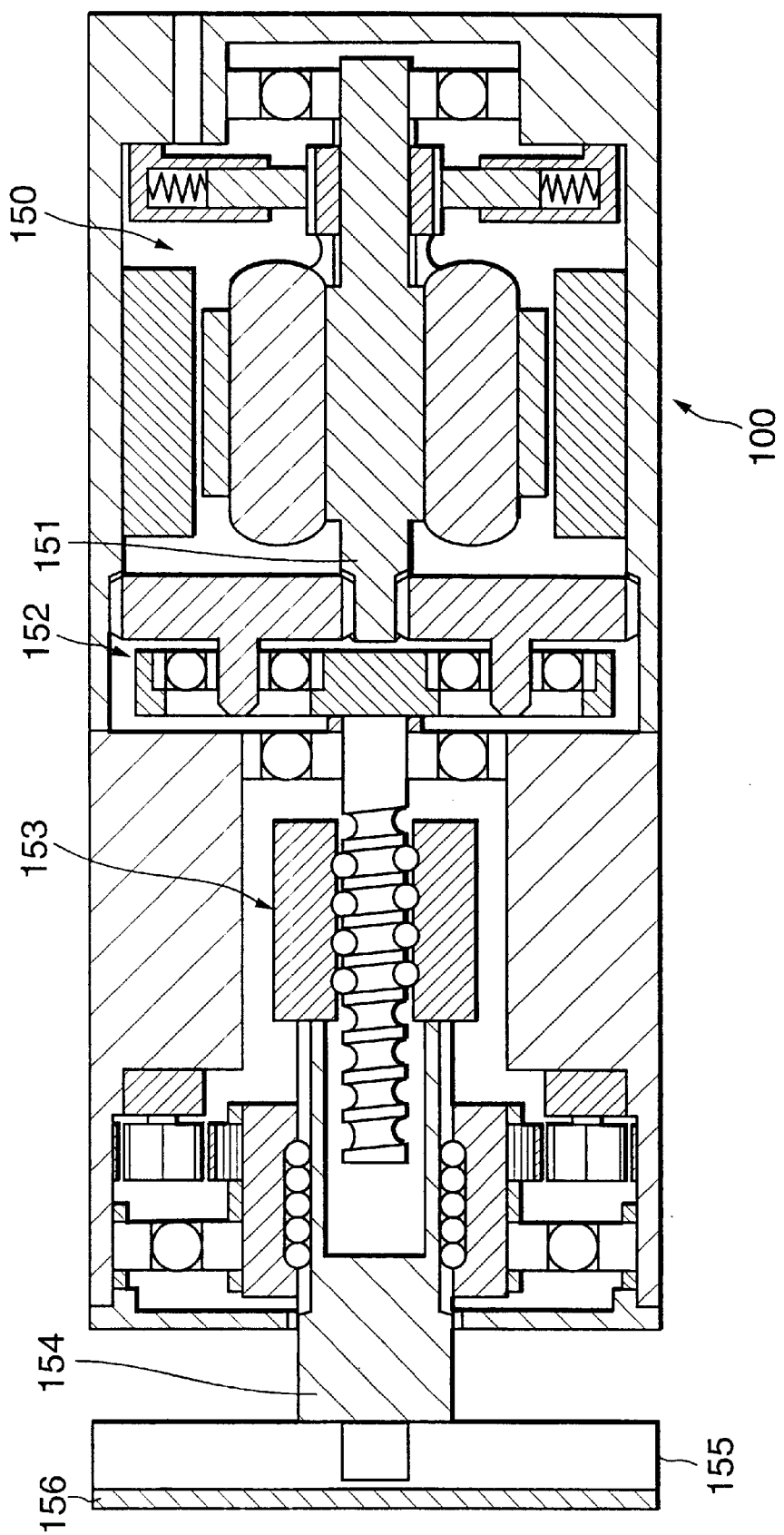
FIG. 10 is a longitudinal sectional view of an actuator according to the sixth embodiment.

FIGS. 9 and 10 show a sixth embodiment of this invention. According to this embodiment, the brake device comprises electromotive actuators 100FL–100RR and a pedal displacement sensor 101A for detecting a degree of depression of the brake peal 101.

The brake pressure controller 10 controls the actuators 100FL–100RR so as to generate a brake pressure according to a depression degree signal Dp detected by the pedal displacement sensor 101A. Also, brake pressure antiskid control is performed on a road surface where any of the wheels 1RL–1RR might lock.

The actuators 100FL–100RR push a brake pad against a disk rotor which rotates together with the wheels 1FL–1RR according to a control signal input from the brake controller 10.

The brake pressure applied to the wheels 1FL–1RR is fed back to the brake pressure controller 10 via a sensor, not shown, and the brake pressure controller 10 feedback controls the actuators 100FL–100RR so that these detected pressures coincide with target pressures.

An actuator which performs in this way is disclosed, for example, in Tokkai Hei 6-327190 published by the Japanese Patent Office in 1994.

As shown in FIG. 10, the actuator is provided with an electric motor 150, a planetary gear mechanism 152 which decelerates the rotation of an output shaft 151 of the electric motor 150, a ball screw unit 153 which converts the rotation output of the planetary gear mechanism 152 into an axial force of a shaft 154, a pressing member 155 fixed to the tip of the shaft 154, and a brake pad 156 fixed to the pressing member 155.

According to this construction, the electric motor 150 which responds to a command signal from the brake pressure controller 10 pushes the brake pad 156 against the disk rotor, not shown. Also, the brake pressure controller 10 compares the command signal output to the electric motor 150 and the real brake pressure applied to the wheels so as to determine a fault in the actuator.

When a fault occurs in the front wheel actuator 100FL or 100FR, as in the case of the aforesaid fifth embodiment, brake pressure control is performed on the front wheel actuator 100FL and rear wheel actuator 100RR as one group, and on the front wheel actuator 100FR and rear wheel actuator 100RL as one group.

For example, when there is a fault in the front wheel actuator 100FR, energization of the electric motor 150 for the group including the actuator 100FR is stopped. Command signals commanding larger brake pressure than normal are also output to the electric motors 150 for the other group, i.e. the actuators 100FL, 100RR.

This increase is performed so that a moment is not produced around the center of gravity of the vehicle, as described in the aforesaid fifth embodiment.

When the front wheel actuator 100FL has a fault, the group wherein energization is stopped and the group wherein brake pressure is increased, are reversed.

Due to this control, the tendency of the vehicle to turn due to a fault of the front wheel actuator can be suppressed.

On the other hand, when either of the rear wheel actuators 100RL, 100RR has a fault, energization of the electric motors 150 for the rear wheel actuators 100RL, 100RR is stopped. Due to this, the brake pressures of the rear wheel actuators 100RL, 100RR become 0, and the command signals to the electric motors 150 for the front wheel actuators 100FL, 100FR are increased.

This calculation is performed by, for example, multiplying the brake pressure in normal operation by a gain of 10/7 as in the processing of the step S204 of the aforesaid first embodiment. In this way, sufficient brake power for the vehicle as a whole can be obtained.

Figure 11:
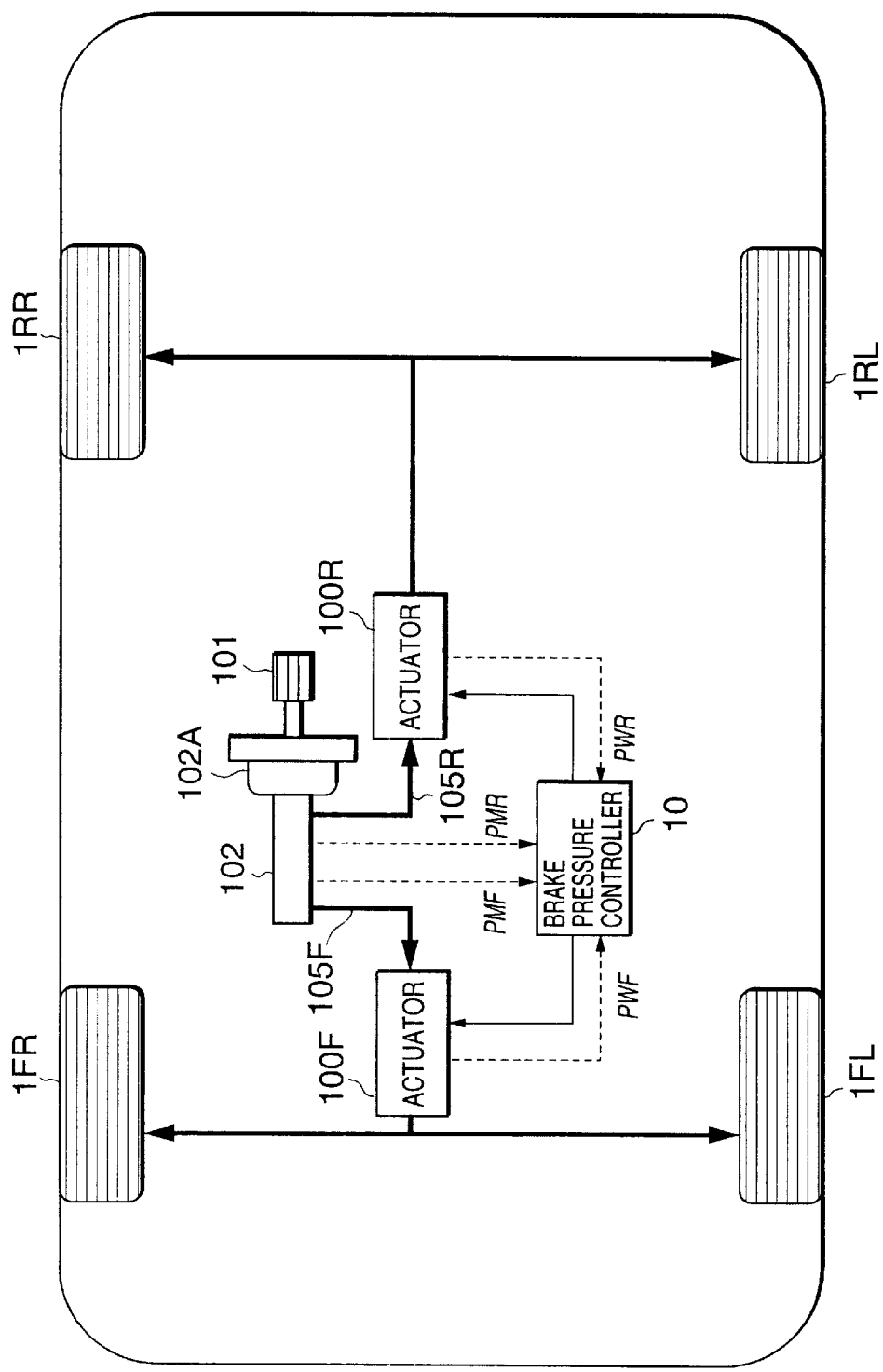
FIG. 11 is a schematic diagram of a brake controller according to a seventh embodiment of this invention.

FIG. 11 shows a seventh embodiment of this invention.

According to this embodiment, the brake device is provided with a common actuator 100F for the front wheels 1FL, 1FR, and a common actuator 100R for the rear wheels 1RL, 1RR. Except for the location of the actuators, the construction is the same as that of the aforesaid first embodiment.

When a fault occurs in either of the actuators 100F, 100R in this brake device, the brake pressure controller 10 switches off the relays connected to the electric motor 135 and shutoff valve 107 of the actuator which is defective, and normal brake pressure control is performed for the actuators which are operating normally.

In a device which does not have the negative pressure booster 102A, the brake pressure of the actuators which are not faulty is increased compared to its value in normal operation.

Control is performed in the same way for a brake device using the electric actuator shown in the aforesaid sixth embodiment, or when the negative pressure booster 102A breaks down.

According to this embodiment, the braking force on the left and right vehicle wheels is always equal, so the vehicle does not attempt to turn even if the actuator is faulty.

For the actuators which are not faulty, the brake pressure Is generated by driving the actuators instead of the master cylinder pressure, so antiskid control is possible.

Figure 12:
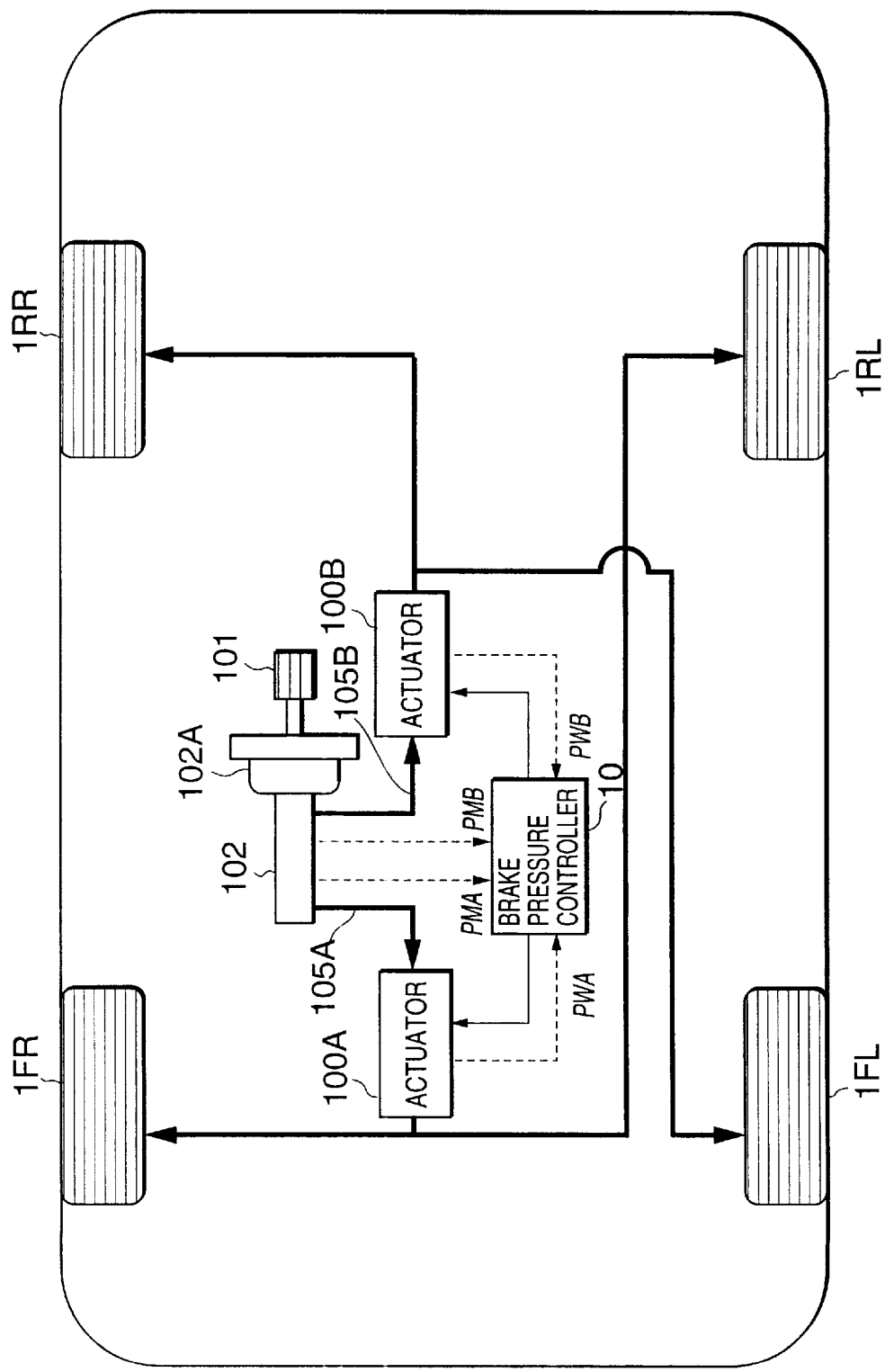
FIG. 12 is similar with FIG. 11, but showing a variation of the seventh embodiment.

FIG. 12 shows a variation of the seventh embodiment. Herein, the right front wheel 1FR and left rear wheel 1RL are connected to the actuator 100A, and the left front wheel 1FL and right rear wheel 1RR are connected to the actuator 100B.

In this case, when one actuator has a fault, all relays affecting this actuator are switched off, and master cylinder pressure is supplied to the wheel cylinder to which this actuator is connected. Regarding the actuators which are not faulty, the same control as for normal operation is performed, and the brake pressure is increased depending on whether the negative pressure booster 102A is present.

Instead of supplying the master cylinder pressure to the faulty actuator, control may be performed so that the brake pressure is effectively 0 as when the rear wheel actuator 100R has a fault in the aforesaid first embodiment. In this way, the forward motion of the vehicle is more reliably ensured.

Figure 13:
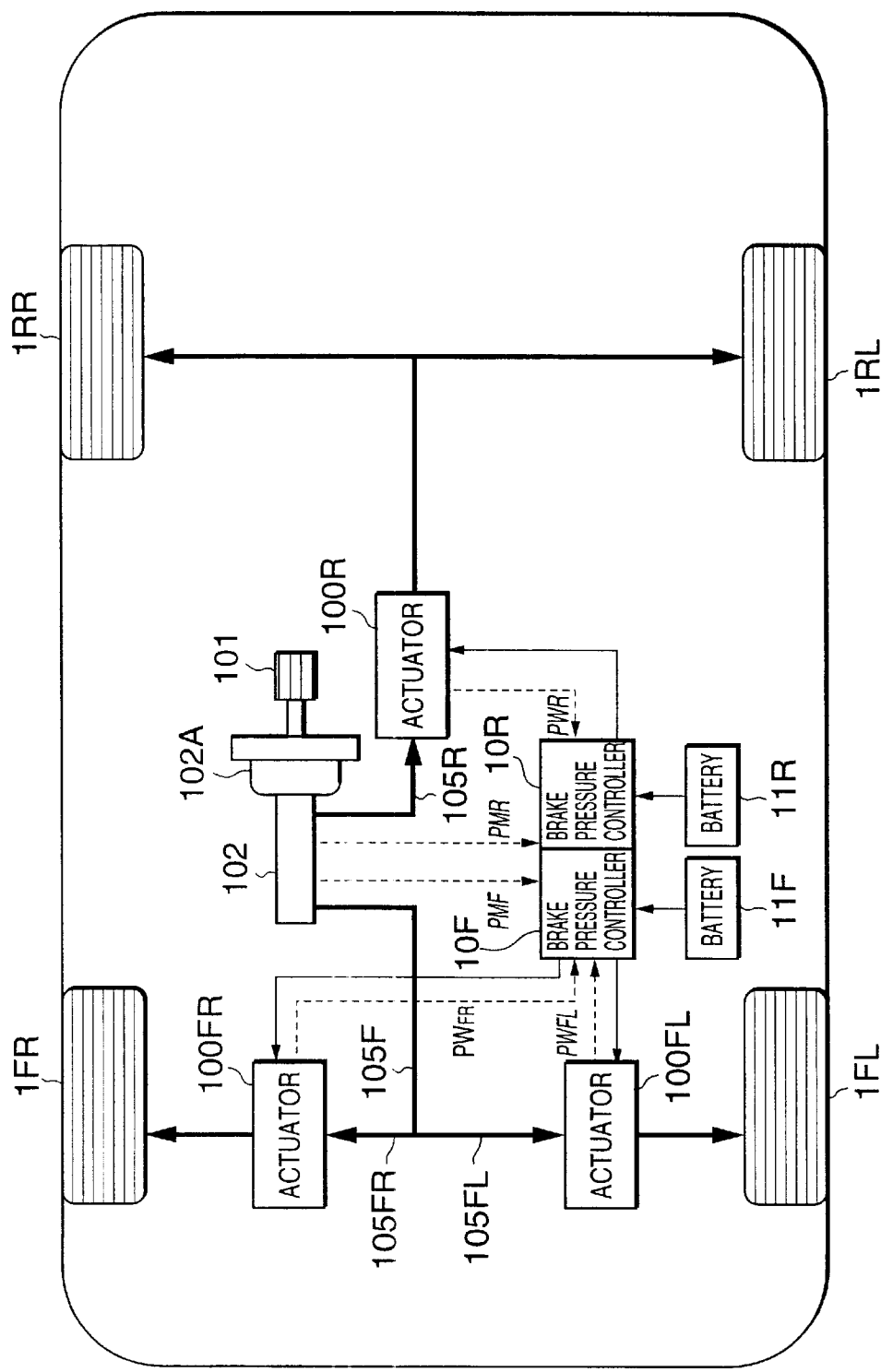
FIG. 13 is a schematic diagram of a brake controller according to an eighth embodiment of this invention.
Figure 14:
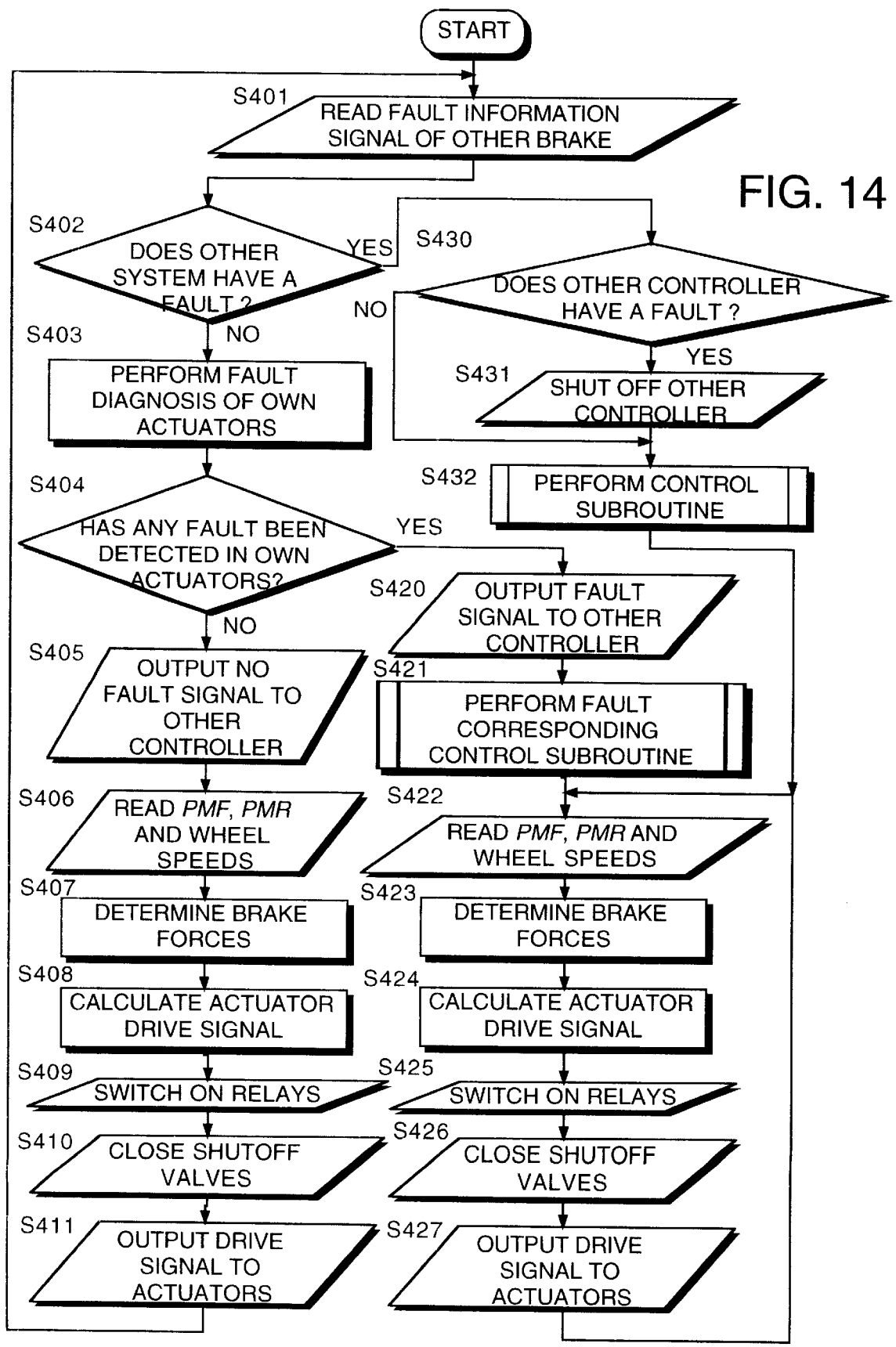
FIG. 14 is a flowchart describing a brake pressure control process performed by the brake controller according to the eighth embodiment.

FIGS. 13 and 14 show an eighth embodiment of this invention.

In this embodiment, the same brake device is controlled by two brake pressure controllers 10F, 10R as in the aforesaid first embodiment. An electric current for the control is supplied to the brake pressure controllers 10F, 10R from batteries 11F, 11R respectively.

According to the aforesaid first embodiment, the case was considered where a specific actuator becomes defective, but it may also occur that an actuator cannot be correctly controlled due to a fault of the brake pressure controller or the battery.

According to this embodiment, the controller is divided into two systems in order to suitably control the brake pressure even when one of the controllers or batteries becomes defective. The brake pressure control process performed by the brake pressure controller 10F, 10R is shown in FIG. 14. First, in a step S401, the brake pressure controller 10F (10R) reads a fault information signal output by the other brake controller 10R (10F), and in a step S402, the presence or absence of a fault in the other brake system is determined.

When it is determined in the step S402 that the other brake pressure control system is operating normally, in a step S403, a diagnosis is made as to whether or not there is a fault in the actuator controlled by the first system as in the case of the step S201 of the aforesaid first embodiment.

When, in a step S404, it is determined from the diagnosis result that there is no fault in the actuator, in a step S405, a signal showing that there is no fault in the actuator is output to the other brake pressure controller 10R (10F). In this case, normal brake pressure control is performed in the steps S406–S411 as in the steps S203–S208 of the aforesaid first embodiment.

On the other hand, when it is determined in the step S404 that there is a fault, the routine proceeds to a step S420, a signal indicating that a fault has occurred is output to the other brake pressure controller 10R (10F).

The signal output in the step S405 and S420 is read as fault information by the other brake pressure controller 10R (10F) in the step S401 on the next occasion the process is performed.

When the brake pressure controller 10F (10R) has a fault, or when energization from the battery 11F (11R) is interrupted, the process itself can no longer be executed and a fault information signal cannot be input to the other controller 10R (10F).

Therefore by determining that a fault has occurred unless a signal to the contrary is input in the step S402, a fault can be detected in the other controller, not only in the actuator but also in the controller or battery.

In a step S421, a control subroutine corresponding to a fault is executed. The details of this subroutine may be set to either processing corresponding to the step S214 of the aforesaid first embodiment or the step S265 of the second embodiment. It is also possible to set the subroutine to perform a similar processing as in the steps S226–S228 of the first embodiment.

In the former case, all relays affecting the faulty actuator are switched off, and the master cylinder pressure is supplied to the wheel cylinder connected to the faulty actuator.

In the latter case, after closing the shutoff valve of the faulty actuator, energization of the electric motor is stopped, and the wheel cylinder pressure is set to 0.

On the other hand, when it is determined in the step S402 that a fault has occurred in the other brake pressure system, it is determined in the step S430 whether the fault has occurred in the brake pressure controller 10R (10F).

This is done by distinguishing whether the signal read in the step S401 is a signal showing a fault, or whether no signal was actually input.

When it is determined in the step S430 that the fault is located in the brake pressure controller, power from the battery 11R (11F) to the other brake pressure controller 10R (10F) is shut off in a step S431. For this purpose, for example, the system may be designed so that the brake pressure controller 10F (10R) and battery 11F(11R) are connected via a relay, this relay being operated from the other brake pressure controller 10R(10F). For example, when power to the brake pressure controller 10F is shut off, control of the corresponding actuators 100FR, 100FL and the shutoff valves 107 connected to them, stops.

As a result, the shutoff valve 107 which is permanently open stays open, and the master cylinder pressure MPF is supplied as a brake pressure to the wheel cylinders 103 of the front wheels 1FL, 1FR. Also, when power to the brake pressure controller 10R is shut off, the master cylinder pressure MPR is similarly supplied to the wheel cylinders 103 of the rear wheels 1RL, 1RR as a brake pressure.

After the processing of the step S431, the routine proceeds to a step S432.

When it is determined in the step S430 that the fault is not located in the brake pressure controller 10R (10F), the step S431 is skipped and the routine proceeds to the step S432.

In the step S432, the control details of the actuators 100FL, 100FR are determined. This determination can be varied according to the determination result of the step S430. In other words, the determination as to whether or not to increase brake pressure is performed according to the determination result of the step S430.

In the following steps S422–S427, the same processing as that of the steps S405–S411 is performed.

According to this embodiment, as plural brake pressure controllers 10F, 10R and plural batteries 11F, 11R are provided, even if one controller breaks down, minimum brake pressure control can be performed by the other brake pressure controller.

A different brake pressure control may also be performed depending on whether an actuator is faulty or a controller is faulty.

For example, when the brake pressure controller 10R or the battery 11R is faulty, the rear wheels 1RL, 1RR, are braked by the master cylinder pressure MPR by the processing of the step S431. On the other hand, when the brake pressure controller 10R and battery 11R are operating normally, and the actuator 100R has a fault, the brake pressure controller 10R performs an actuator fault control subroutine in the step S421.

If according to this subroutine, for example, the shutoff valve 107 is opened and the rear wheels 1RL, 1RR are braked by the master cylinder pressure, the braking pressure on the rear wheels is the same as when the brake pressure controller 10R has a fault.

On the other hand, if according to this subroutine, the brake pressure of the actuators 100FL, 100FR is set to 0, the brake pressure on the rear wheels 1RL, 1RR is different from when the brake pressure controller 10R or battery 11R has a fault.

In a step S432, the front wheel brake pressure controller 10F determines the control of brakes pressure of the actuators 100FL, 100FR by taking this difference into account. In other words, when for example the actuator 100R has a fault, the brake pressure of the actuators 100FL, 100FR is increased to be greater than the pressure based on the depression degree of the brake pedal.

When the controller 10R or the battery 11R has a fault, this increase is not applied, and ordinary brake pressure control is performed.

When the front wheel actuators 100FL, 100FR or the brake pressure controller 10F has a fault, the rear brake pressure controller 10R performs the same control.

Therefore, even when there is a fault in an actuator or even when there is a fault in a controller or battery, the total braking force acting on the vehicle can be kept substantially constant.

Before the processing of the steps S422–S427, it is possible to insert a step for first reducing the wheel cylinder pressure of the braking system which does not have a fault, and the processing of the steps S422–S427 can be performed after a predetermined time has elapsed from this reduction of the wheel cylinder pressure. Such a variation is realized by, for example, inserting the steps S252–S256 of the aforesaid second embodiment between the steps S432 and S422.

In this embodiment, the two batteries 11F, 11R are connected to the two brake pressure controllers 10F, 10R, however, this embodiment can also be applied to a brake device wherein there is a common battery but the brake pressure controllers are separately provided.

Figure 15:
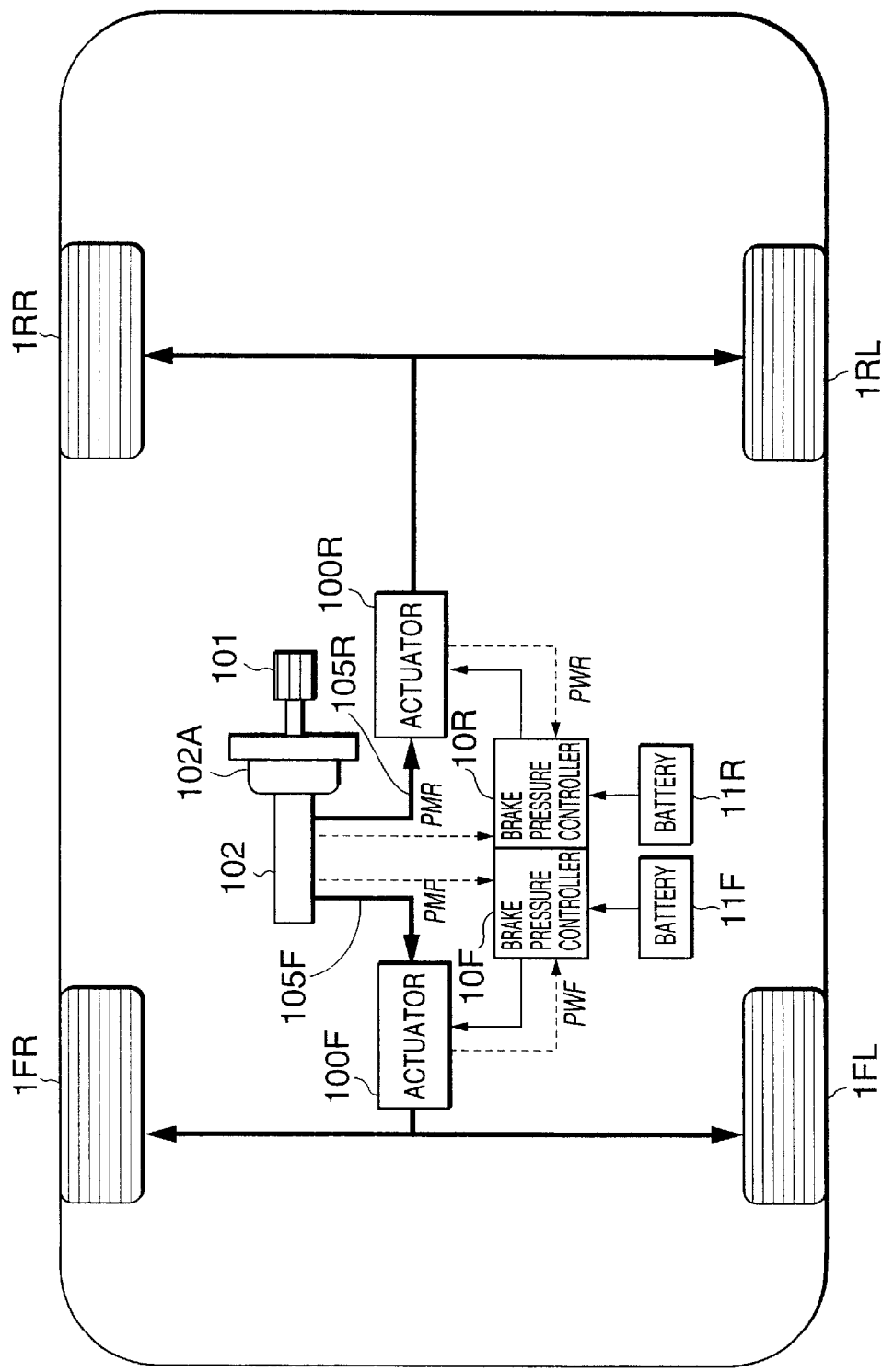
FIG. 15 is similar to FIG. 11, but showing a variation of the eighth embodiment.

FIGS. 15–20 show a variation of the brake device with dual brake pressure controllers to which the control algorithm of FIG. 14 may be applied. FIG. 15 shows a brake device wherein the front wheels 1FL, 1FR and rear wheels 1RL, 1RR are each braked by one actuator as in the case of the brake device shown in FIG. 11.

Figure 16:
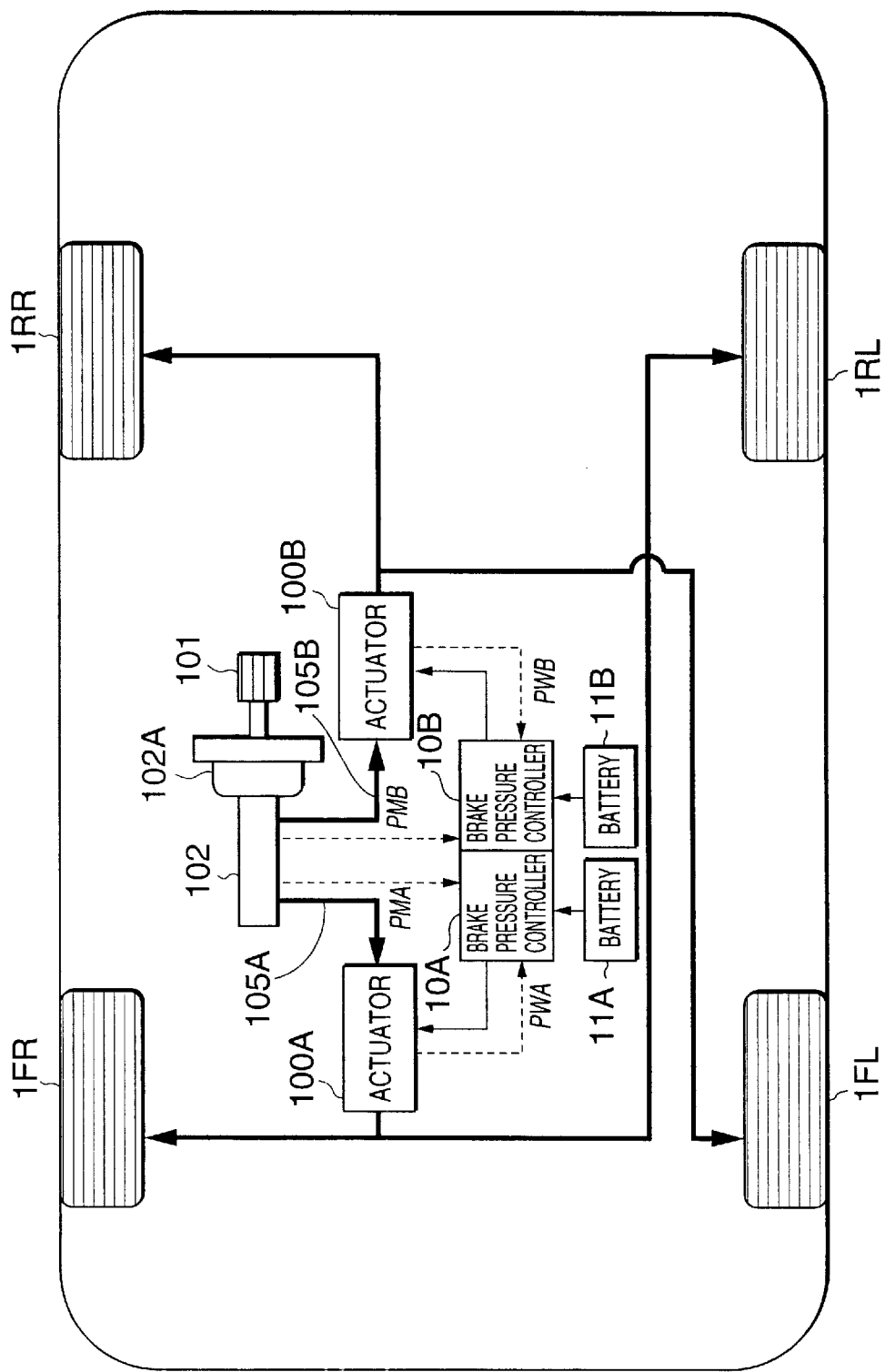
FIG. 16 is similar to FIG. 12, but showing another variation of the eighth embodiment.

FIG. 16 shows a brake device wherein the right front wheel 11FR and left rear wheel 1RL are connected to the actuator 100A and the left wheel front wheel 1FL and right rear wheel 1RR are connected to the actuator 100B as in the case of the brake device shown in FIG. 12.

Figure 17:
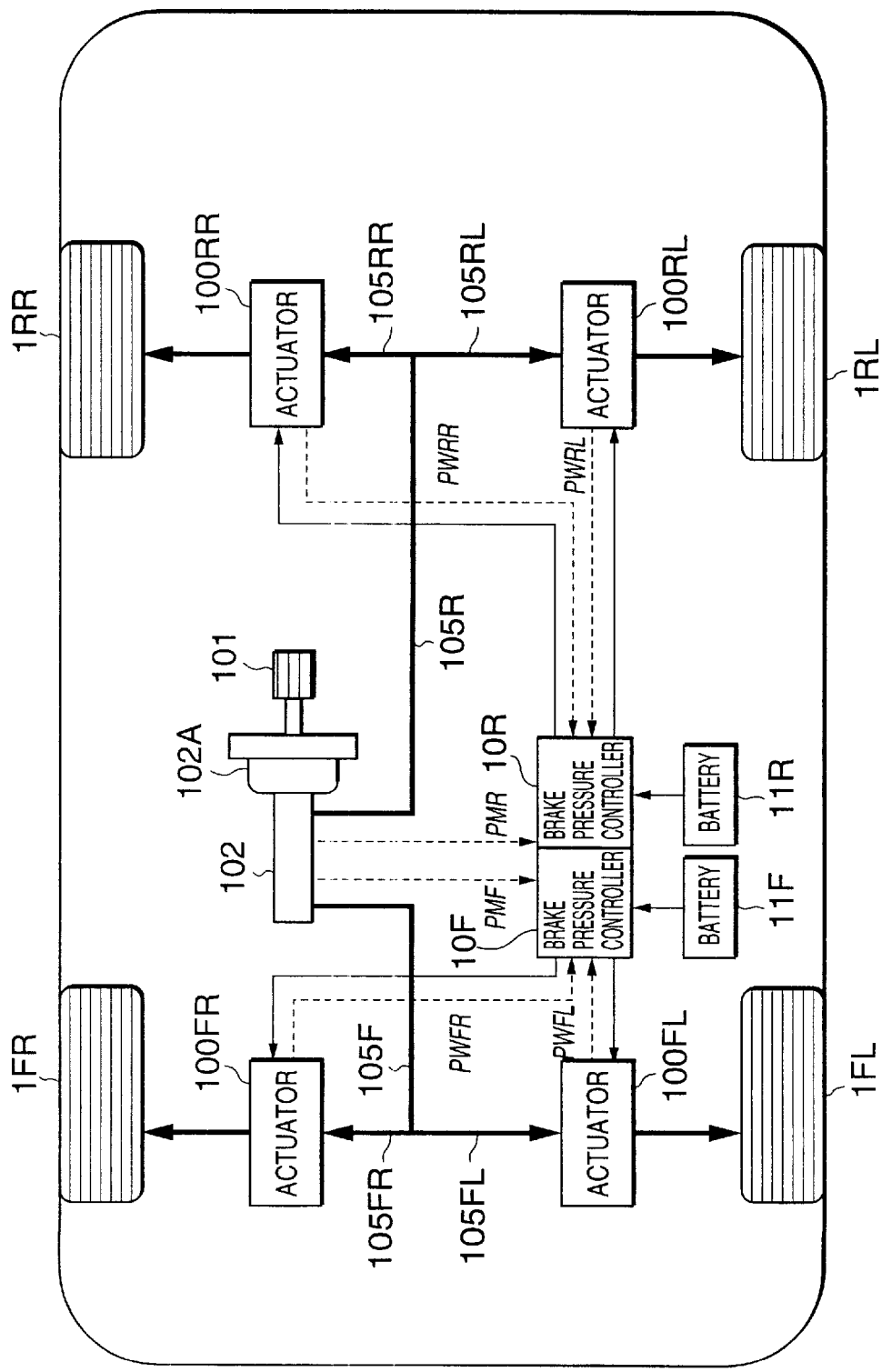
FIG. 17 is similar to FIG. 4, but showing yet another variation of the eighth embodiment.

FIG. 17 shows a brake device wherein an actuator is provided for each wheel as in the case of the brake device shown in FIG. 4.

Figure 18:
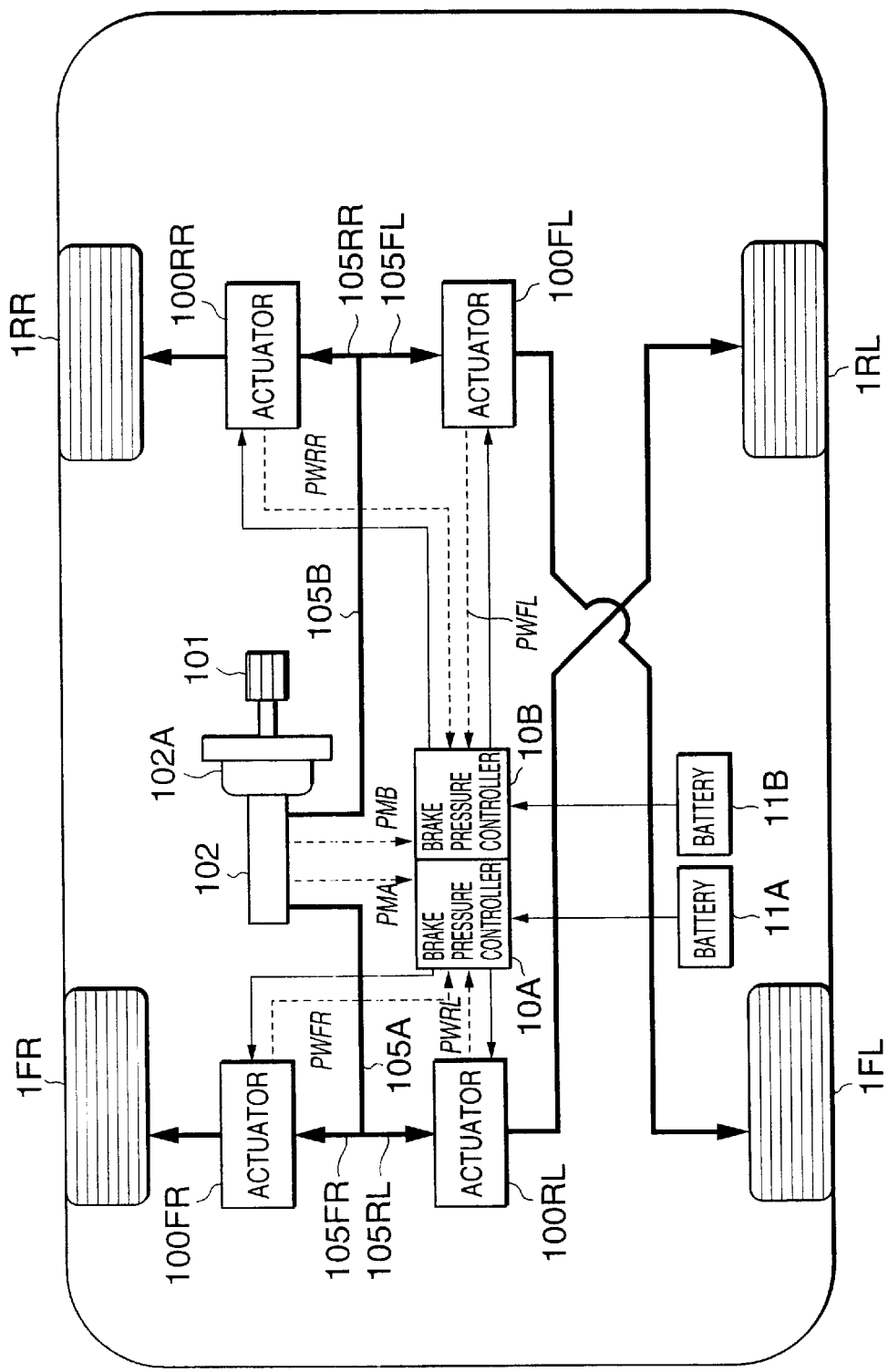
FIG. 18 is similar to FIG. 8, but showing yet another variation of the eighth embodiment.

FIG. 18 shows a brake device wherein an actuator is provided for each wheel as in the case of the brake device shown in FIG. 8.

Herein, the brake pressure controller 10A controls the brake pressure of the front wheel actuator 100FR and rear wheel actuator 100RL as one group, and the brake pressure controller 10B controls the brake pressure of the front wheel actuator 100FL and rear wheel actuator 100RR as one group.

Figure 19:
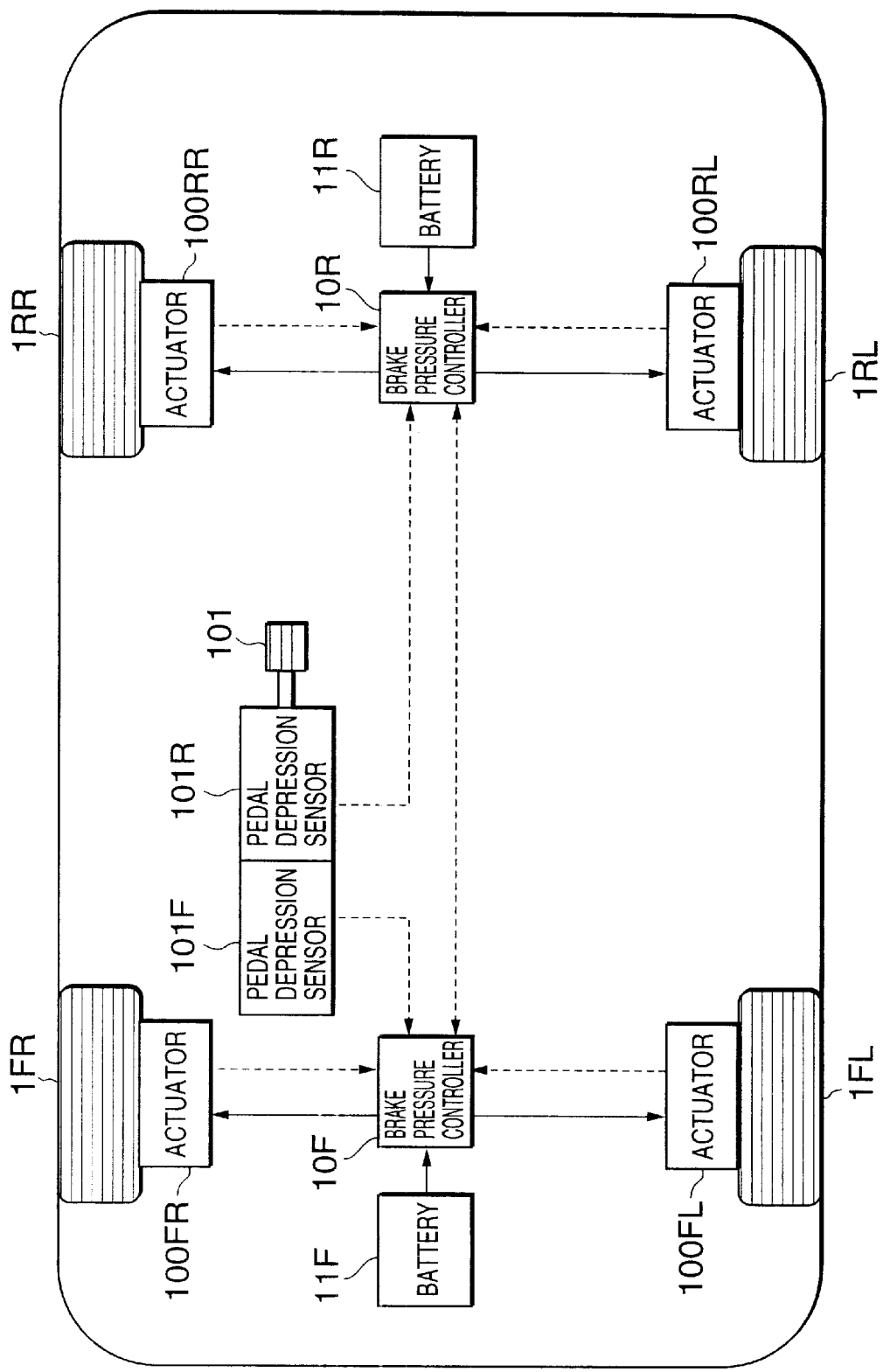
FIG. 19 is similar to FIG. 9, but showing yet another variation of the eighth embodiment.

FIG. 19 shows a brake device which controls brake pressure without a braking mechanism using hydraulic pressure, provided with electrical actuators 100FL–100RR for each of the wheels 1FL–1RR and pedal displacement sensors 101F, 101R which detect the depression degree of the brake pedal 101, as in the case of the pedal displacement sensor 101A shown in FIG. 9.

The brake pressure controller 10A controls the brake pressure of the front wheel actuators 100FL, 100FR according to the depression degree signal Dp from the sensor 101F, and the brake pressure controller 10B controls the brake pressure of the rear wheel actuators 100RL, 100RR according to the depression degree signal Dp from the sensor 101R.

Figure 20:
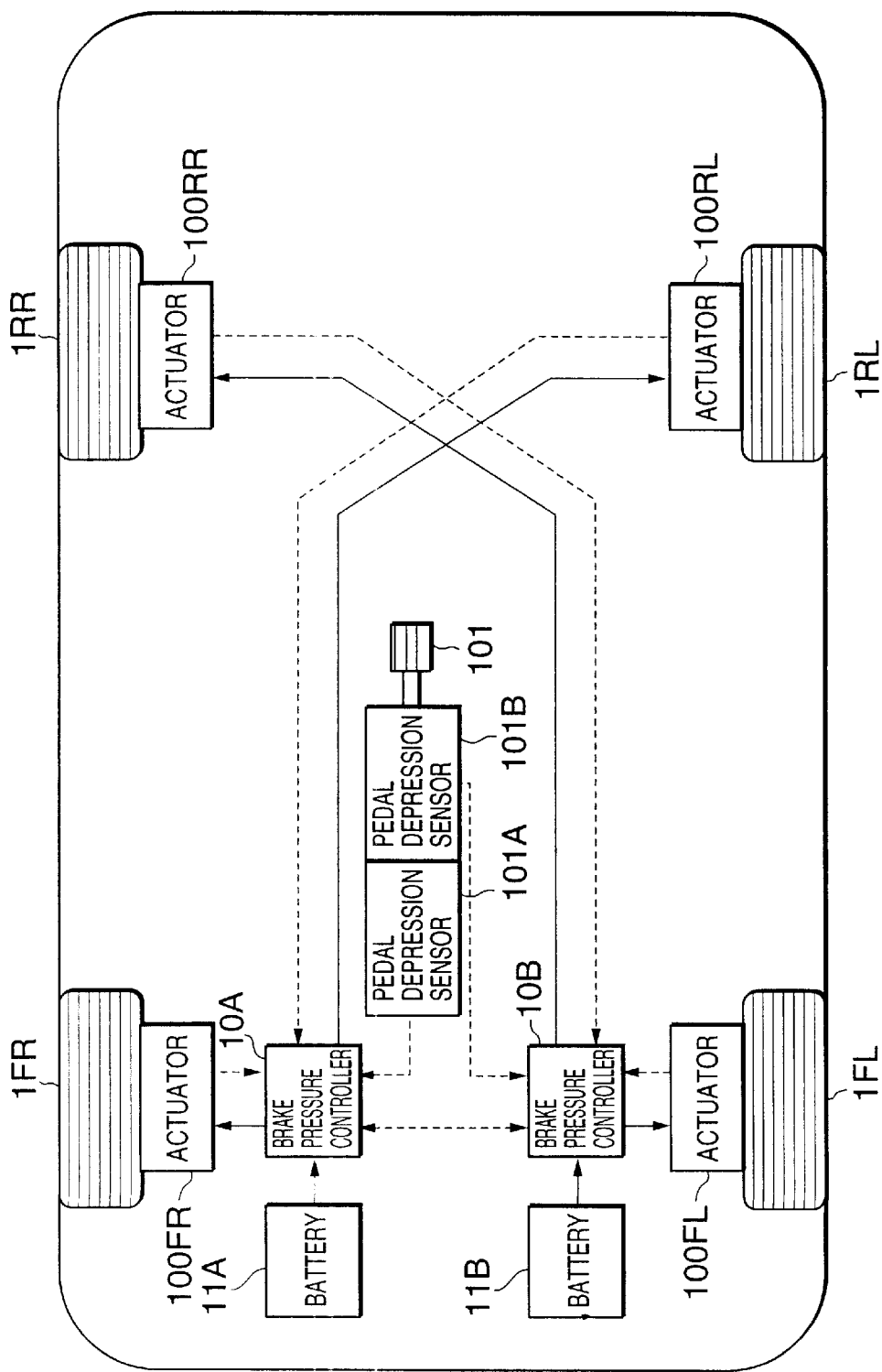
FIG. 20 is similar to FIG. 19, but showing yet another variation of the eighth embodiment.

FIG. 20 shows a brake device provided with actuators 100FR–100RL as in FIG. 10, but the brake pressure controller 10A controls the brake pressure of the front right actuator 100FR and the left rear actuator 100RL according to the depression degree signal Dp from the sensor 101A, and the brake pressure controller 10B controls the brake pressure of the front left actuator 100FL and the rear right actuator 100RR according to the depression degree signal Dp from the sensor 101B.

The process of controlling braking pressure according to the eighth embodiment may be applied as a control process performed by the brake pressure controllers 10A, 10B in all the brake devices shown in FIGS. 15–20.

Figure 21:
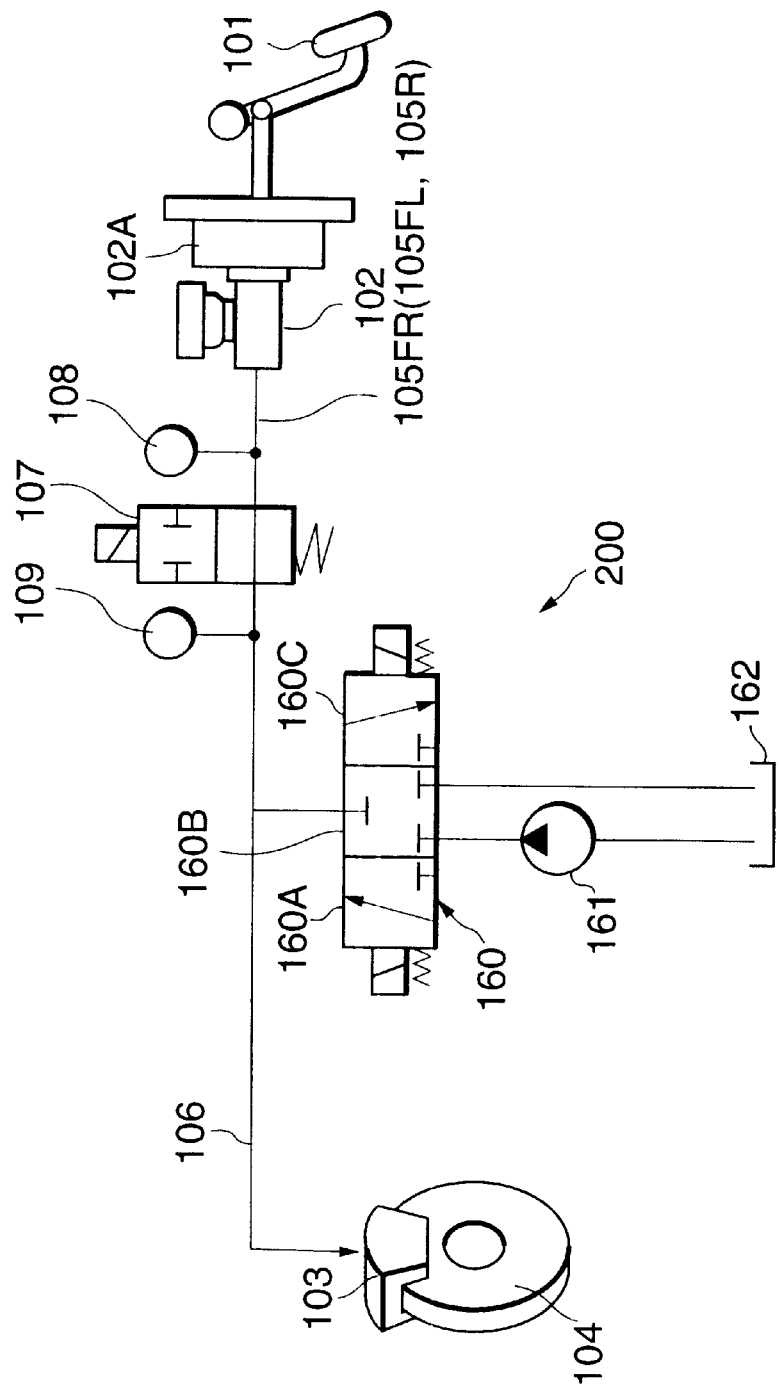
FIG. 21 is an oil pressure circuit diagram of an actuator according to a ninth embodiment of this invention.

FIG. 21 shows a ninth embodiment of this invention. According to this embodiment, instead of the motor drive actuators 100FL–100RR, a pressurizing unit 200 comprising a solenoid valve 160 and hydraulic pump 161 is connected to a brake pipe 106. The pressure of the brake pipe 106 acting on the wheel cylinder 103 is increased or decreased by selectively connecting the brake pipe 106 to the pump 161 or a tank 162 according to a command signal from the brake pressure controller 10.

This invention may also be applied to a brake device using the pressurizing unit 200.

Also, an arrangement may be adopted wherein the master cylinder pressure is increased using the negative pressure booster 102A, this pressure is decreased by connecting a decompression unit to the brake pipe 106 and the brake pressure controller controls the brake pressure via this decompression unit.

Figure 22:
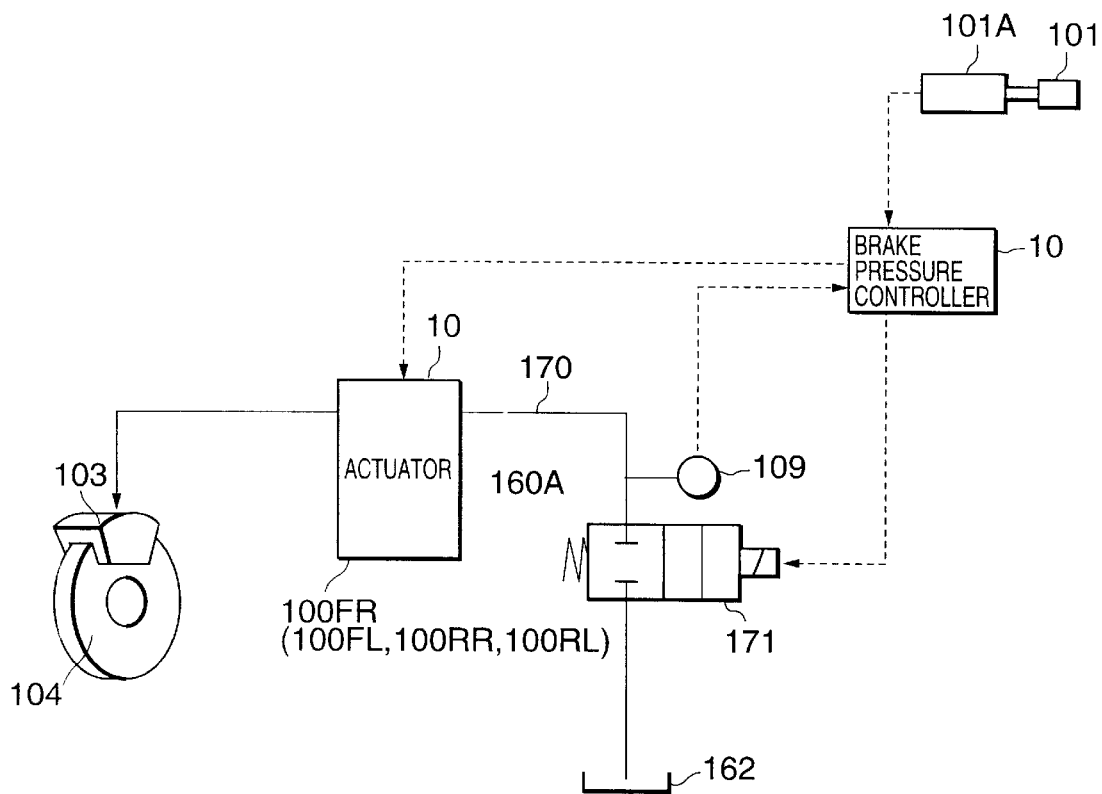
FIG. 22 is an oil pressure circuit diagram of an actuator according to a tenth embodiment of this invention.

FIG. 22 shows a tenth embodiment of this invention.

In this embodiment, a drain pipe 170 is connected to the actuator 10. The drain pipe 170 is connected to a drain 162 via an electromagnetic solenoid valve 171.

The depression degree of the brake pedal 101 is detected by the pedal sensor 101A. The brake pressure controller 10 controls the actuator 10 and electromagnetic solenoid valve 171 so that the pressure of the wheel cylinder 103 obtained depends on the depression degree of the brake pedal 101. This invention may also be applied to such a brake device.

Figure 23:
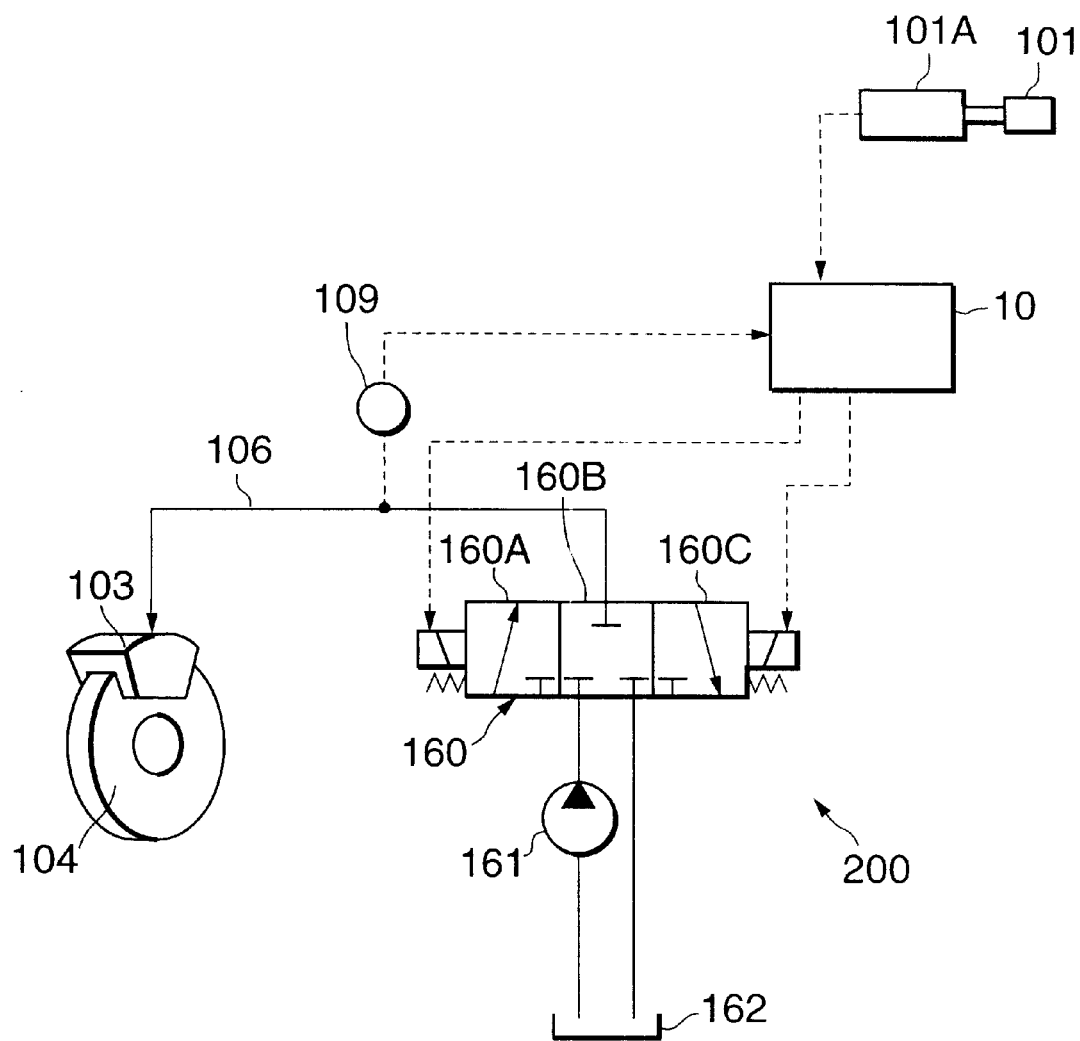
FIG. 23 is an oil pressure circuit diagram of an actuator according to an eleventh embodiment of this invention.

FIG. 23 shows an eleventh embodiment of this invention.

In this embodiment, instead of the actuator 10 and drain pipe 170 and electromagnetic solenoid valve 171 of FIG. 22, a pressurizing unit 200 as in the aforesaid ninth embodiment is connected to the brake pipe 106. This invention may also be applied to such a brake device.

The corresponding structures, materials, acts, and equivalents of all means plus function elements in the claims below are intended to include any structure, material, or acts for performing the functions in combination with other claimed elements as specifically claimed. The embodiments of this invention in which an exclusive property or privilege is claimed are defined as follows:

What is claimed:

1. A brake pressure controller for use with a vehicle brake device, said device comprising a first actuator group comprising one or more actuators for generating a brake pressure for a predetermined combination of a left wheel and a right wheel corresponding to a depression degree of a brake pedal, and a second actuator group comprising one or more actuators for generating a brake pressure for another predetermined combination of a left wheel and a right wheel corresponding to the depression degree of said brake pedal, said controller comprising:

a sensor for detecting a faulty actuator, and a microprocessor programmed to:

prevent, when a faulty actuator is found, a faulty actuator group to which said faulty actuator belongs from generating a brake pressure, while controlling the other actuator group to generate a brake pressure greater than the brake pressure corresponding to the depression degree of said brake pedal.

2. A brake pressure controller as defined in claim 1, wherein said brake device further comprises a master cylinder for generating a master cylinder pressure corresponding to said depression degree of said brake pedal and a valve for supplying said master cylinder pressure respectively to the wheels, and said microprocessor is further programmed to control said faulty actuator group and said valve to apply said master cylinder pressure to the wheels corresponding to said faulty actuator group.

3. A brake pressure controller as defined in claim 1, wherein said microprocessor is further programmed to control said faulty actuator group to decrease the brake pressure generated in said faulty actuator group to be equal to zero.

4. A brake pressure controller as defined in claim 1, wherein said predetermined combination of a left wheel and a right wheel is a left front wheel and a right front wheel, said other predetermined combination of a left wheel and a right wheel is a left rear wheel and a right rear wheel, and said microprocessor is further programmed to control said second actuator group when said faulty actuator group is said second actuator group such that the brake pressure generated by said second actuator group is zero, and control said first actuator group to generate a brake pressure greater than the brake pressure corresponding to the depression degree of the brake pedal.

5. A brake pressure controller as defined in claim 4, wherein said brake device is provided with a master cylinder for generating a master cylinder pressure according to said depression degree of said brake pedal and a valve for supplying said master cylinder pressure respectively to the wheels, and said microprocessor is further programmed to control said first actuator group and said valve to apply said master cylinder pressure to the left front wheel and right front wheel, when said faulty actuator group is said first actuator group.

6. A brake pressure controller as defined in claim 4, wherein said brake device is provided with a master cylinder for generating a master cylinder pressure according to said depression degree of said brake pedal and a valve for supplying said master cylinder pressure respectively to the wheels, and said microprocessor is further programmed to control said second actuator group and said valve to apply said master cylinder pressure to the left rear wheel and right rear wheel, when said faulty actuator group is said second actuator group.

7. A brake pressure controller as defined in claim 1, wherein said predetermined combination of a left wheel and a right wheel is a left front wheel and a right front wheel, said other predetermined combination of a left wheel and a right wheel is a left rear wheel and a right rear wheel, said brake device is provided with a master cylinder for generating a master cylinder pressure according to said depression degree of said brake pedal and a valve for supplying said master cylinder pressure respectively to the wheels, and said microprocessor is further programmed to control said first actuator group and said valve to apply said master cylinder pressure to the left front wheel and right front wheel when said faulty actuator group is said first actuator group, and control said second actuator group to generate a brake pressure greater than the brake pressure corresponding to said depression degree of said brake pedal.

8. A brake pressure controller as defined in claim 1, wherein said predetermined combination of a left wheel and a right wheel is a right front wheel and a left rear wheel, said other predetermined combination of a left wheel and a right wheel is a left front wheel and a right rear wheel, said brake device is provided with a master cylinder for generating a master cylinder pressure according to said depression degree of said brake pedal and a valve for supplying said master cylinder pressure respectively to the wheels, and said microprocessor is further programmed to control said first actuator group and said valve to apply said master cylinder pressure to the right front wheel and left rear wheel when said faulty actuator group is said first actuator group, and control said second actuator group and said valve to apply said master cylinder pressure to the left front wheel and right rear wheel when said faulty actuator group is said second actuator group.

9. A brake pressure controller as defined in claim 8, wherein said microprocessor is further programmed to control said second actuator group to generate a brake pressure greater than the brake pressure corresponding to said depression degree of said brake pedal, when said faulty actuator group is said first actuator group, and control said first actuator group to generate a brake pressure greater than the brake pressure corresponding to said depression degree of said brake pedal, when said faulty actuator group is said second actuator group.

10. A brake pressure controller for use with a vehicle brake device, said device comprising a first actuator group comprising one or more actuators for generating a brake pressure for a predetermined combination of a left wheel and a right wheel corresponding to a depression degree of a brake pedal, a second actuator group comprising one or more actuators for generating a brake pressure for another predetermined combination of a left wheel and a right wheel corresponding to the depression degree of said brake pedal, and a master cylinder for generating a master cylinder pressure according to said depression degree of said brake pedal and a valve which is permanently open for supplying said master cylinder pressure respectively to the wheels, said controller comprising:
  a sensor for detecting a faulty actuator,
  a first microprocessor programmed to:
    prevent said first actuator group from generating a brake pressure when an actuator in said first actuator group is faulty,
  a second microprocessor programmed to:
    prevent said second actuator group from generating a brake pressure when an actuator in said second actuator group is faulty,
  a sensor for detecting a fault in said first microprocessor, and
  a sensor for detecting a fault in said second microprocessor,
  wherein said second microprocessor is further programmed to shut off power to said first microprocessor when a fault is detected in said first microprocessor, and said first microprocessor is further programmed to shut off power to said second microprocessor when a fault is detected in said second microprocessor.

11. A brake pressure controller as defined in claim 10, wherein said second microprocessor is further programmed to control said valve to apply said master cylinder pressure to the wheels corresponding to said first actuator group when a fault is detected in said first microprocessor, and said first microprocessor is further programmed to control said valve to apply said master cylinder pressure to the wheels corresponding to said second actuator group when a fault is detected in said second microprocessor.

12. A brake pressure controller as defined in claim 10, wherein said first microprocessor is further programmed to control said first actuator group when a fault is detected in an actuator in said first actuator group to decrease the brake pressure generated in said faulty actuator group to be equal to zero, and said second microprocessor is further programmed to control said second actuator group when a fault is detected in an actuator in said first actuator group to generate a brake pressure greater than the brake pressure corresponding to said depression degree of said pedal.

13. A brake pressure controller for use with a vehicle brake device, said device comprising a first actuator group comprising one or more actuators for generating a brake pressure for a predetermined combination of a left wheel and a right wheel corresponding to a depression degree of a brake pedal, and a second actuator group comprising one or more actuators for generating a brake pressure for another predetermined combination of a left wheel and a right wheel corresponding to the depression degree of said brake pedal, said controller comprising:
  means for detecting a faulty actuator,
  means for preventing, when a faulty actuator is found, a faulty actuator group to which said faulty actuator belongs from generating a brake pressure, while controlling the other actuator group to generate a brake pressure greater than the brake pressure corresponding to the depression degree of said brake pedal.

14. A brake pressure controller for use with a vehicle brake device, said device comprising a first actuator group comprising a plurality of actuators for generating a brake pressure for a predetermined combination of a left wheel and a right wheel corresponding to a depression degree of a brake pedal, and a second actuator group comprising an actuator for generating a brake pressure for another predetermined combination of a left wheel and a right wheel corresponding to the depression degree of said brake pedal, said controller comprising:
  a sensor to detect a fault of an actuator in the first actuator group, and
  a microprocessor programmed to:
    prevent, when a fault of an actuator is found in the first actuator group, all the actuators in the first actuator group from generating a brake pressure, while controlling the actuator of the second actuator group to generate a brake pressure greater than the brake pressure corresponding to the depression degree of said brake pedal.

* * * * *